(12) United States Patent
Greiss et al.

(10) Patent No.: US 7,170,931 B2
(45) Date of Patent: Jan. 30, 2007

(54) COMBINED FEED FORWARD AND BLIND EQUALIZER

(75) Inventors: Israel Greiss, Raanana (IL); Baruch Bublil, Netanya (IL); Jeffrey Jacob, Raanana (IL); Dimitry Taich, Kfar-Saba (IL)

(73) Assignee: Mysticom Ltd., South Netanya (IL)

( * ) Notice: Subject to any disclaimer, the term of this patent is extended or adjusted under 35 U.S.C. 154(b) by 720 days.

(21) Appl. No.: 10/320,771

(22) Filed: Dec. 16, 2002

(65) Prior Publication Data
US 2003/0138039 A1 Jul. 24, 2003

Related U.S. Application Data

(60) Provisional application No. 60/341,526, filed on Dec. 17, 2001.

(51) Int. Cl.
*H03H 7/30* (2006.01)
*H03H 7/40* (2006.01)
*H03K 5/159* (2006.01)

(52) U.S. Cl. ............... 375/232; 375/234; 375/231; 375/229

(58) Field of Classification Search ........ 375/232, 375/234, 231, 229; 333/18, 28 R; 708/300, 708/301, 319, 323
See application file for complete search history.

(56) References Cited

U.S. PATENT DOCUMENTS

| | | | |
|---|---|---|---|
| 5,095,484 A | | 3/1992 | Karabed et al. |
| 5,587,709 A | | 12/1996 | Jeong |
| 5,642,382 A | * | 6/1997 | Juan .................. 375/232 |
| 5,710,793 A | * | 1/1998 | Greenberg ............. 375/232 |
| 6,016,330 A | | 1/2000 | Ashley et al. |
| 6,192,072 B1 | | 2/2001 | Azadet et al. |
| 6,266,366 B1 | | 7/2001 | Greiss et al. |
| 6,307,906 B1 | | 10/2001 | Tanji et al. |

FOREIGN PATENT DOCUMENTS

| | | |
|---|---|---|
| WO | WO 97/01888 | 1/1997 |
| WO | WO 00/28691 | 5/2000 |
| WO | WO 01/52469 | 7/2001 |

OTHER PUBLICATIONS

Mueller and Muller, "Timing Recovery in Digital Synchronous Data Receivers", IEEE Transactions on Communications, pp. 516-531, vol. 24, May 1976.

"8 to 10-bit/10 to 8-bit Data Conversion with Frame Disparity Generating/Checking", IBM Technical Disclosure Bulletin, IBM Corp. New York, vol. 34, No. 4A, Sep. 1991.

Tuukkanen, V et al, "Combined Interpolation and Maximum Likelihood Symbol Timing Recovery in Digital Receivers", 1997 IEEE 6th, International Conference on Universal Personal Communications Record, San Diego, Oct. 12-16, 1997, New York, USA. vol. 2, Conf. 6, pp. 698-702.

Bouttier A, "A Truly Recursive Blind Equalization Algorithm", Proceedings of the 1998 IEEE International Conference on Acoustics, Speech and Signal Processing. ICASSP '98, Seattle, vol. 6, Conf. 23, pp. 3381-3384.

* cited by examiner

*Primary Examiner*—Chieh M. Fan
*Assistant Examiner*—Anna Ziskind
(74) *Attorney, Agent, or Firm*—Abelman, Frayne & Schwab

(57) ABSTRACT

An equalizer, consisting of a plurality of taps, each tap having a multiplier which is coupled to multiply a respective input sample by a respective coefficient, the taps being arranged in sequence so that the input sample to each of the taps, except to a first tap in the sequence, is delayed relative to a preceding tap in the sequence.

The equalizer further includes an input selector, which is coupled to toggle the input sample to at least a selected tap among the plurality of taps, responsive to a state of the equalizer, so that the equalizer operates in a first state as a feed forward equalizer, and in a second state as a blind equalizer.

12 Claims, 25 Drawing Sheets

COMBINED FEED FORWARD AND BLIND EQUALIZER

CROSS-REFERENCE TO RELATED APPLICATIONS

This application claims the benefit of U.S. Provisional Patent Application 60/341,526, filed Dec. 17, 2001, which is incorporated herein by reference.

FIELD OF THE INVENTION

The present invention relates generally to data communication, and specifically to communicating data using multiple physical lines.

BACKGROUND OF THE INVENTION

As communication speeds have increased, the demands to transmit signals over existing infrastructures have become significantly harder to meet. Four twisted pair Ethernet cabling, originally conceived for conveying signals at 1 or 10 Mb/s, is now required to convey signals at rates of the order of 1 Gb/s. Inter alia, the increased throughput leads to increased processing requirements for received signals as well as increased impairment of the received signals.

An IEEE standard 802.3ab, published by the Institute of Electronic and Electrical Engineers, New York, N.Y., describes an Ethernet protocol wherein data may be transmitted as five-level pulse amplitude modulation (PAM-5) signals over category-5 cables, comprising four pairs of twisted wires. The data may be transmitted in a full-duplex mode at rates of the order of 1 Gb/s. As in most data transmission systems, signal degradation along a transmission path means that signal recovery becomes increasingly more difficult as the path length increases, and/or as the rate of transmission increases. In particular, recovering the clocks for such degraded signals is a significant problem as signal frequencies increase, both because of the increased degradation of the signals and also because of the reduced time available for processing the signals.

In a paper by Mueller and Muller, "Timing recovery in digital synchronous data receivers," IEEE Transactions on Communications, pp 516–531, Vol. 24, May 1976, the authors propose a timing recovery algorithm. The paper is accepted in the art as the basis for timing recovery algorithms, and relies on selecting a timing function of a best sampling point. The phase of the sampling point is then adjusted until its timing function is zero.

U.S. Pat. No. 6,192,072, to Azadet et al., whose disclosure is incorporated herein by reference, describes a parallel processing decision feedback equalizer (DFE) which may be applied to recovering the clocks from IEEE 802.3ab signals transmitted on four pairs of wires. The method relies on multiple clock domains, respective clock recovery being performed on each pair of wires.

SUMMARY OF THE INVENTION

It is an object of some aspects of the present invention to provide an equalizer of enhanced versatility.

In a preferred embodiment of the present invention, an adaptive finite impulse response (FIR) filter, comprising multiple taps separated by corresponding time delays, is able to operate as either a feed forward equalizer (FFE) or as a blind equalizer in a data receiver. When operating as the blind equalizer, a difference between signals across one of the time delays is generated. The difference is input to one of the taps, preferably the tap after the time delay, which then generates a blind error signal which is in turn used to update a coefficient of the blind equalizer. When operating as the FFE, the input to the tap reverts to the non-differential signal produced by the time delay. Using the same filter as both a blind equalizer and as an FFE conserves gate count and power dissipation. Feeding a differential input to one of the blind equalizer taps increases the high frequency component of the signal input to the tap, which significantly improves the performance of the equalizer.

The filter most preferably operates as the blind equalizer during an initial stage of operation of the data receiver. Once the blind equalizer has converged, the filter switches to operating as the FFE equalizer, using the coefficient values found by the blind equalizer to generate initial coefficient values for the FFE.

There is therefore provided, according to a preferred embodiment of the present invention, an equalizer, including:

a plurality of taps, each tap including a multiplier which is coupled to multiply a respective input sample by a respective coefficient, the taps being arranged in sequence so that the input sample to each of the taps, except to a first tap in the sequence, is delayed relative to a preceding tap in the sequence; and an input selector, which is coupled to toggle the input sample to at least a selected tap among the plurality of taps, responsive to a state of the equalizer, so that the equalizer operates in a first state as a feed forward equalizer, and in a second state as a blind equalizer.

Preferably, the equalizer includes coefficient update circuitry, which receives an error signal as an input and determines the respective coefficient to be applied to each of the taps responsive to the error signal, wherein the error signal is provided in the second state by the selected tap, and wherein the input selector is adapted to toggle the input sample to the selected tap so that in the second state the input sample to the selected tap includes a differential signal.

Preferably, the differential signal includes a difference between the input sample to the selected tap and the input sample to the tap preceding the selected tap.

Further preferably, at least one of the respective coefficients is zero.

Preferably, the equalizer includes a slicer which in the first state of the equalizer provides the error signal.

Preferably, the respective coefficient includes a blind coefficient determined by the coefficient update circuitry when the equalizer is operative in the second state and a feed forward coefficient determined by the coefficient update circuitry when the equalizer is operative in the first state, and wherein the coefficient update circuitry determines the feed forward coefficient responsive to the blind coefficient. Further preferably, the feed forward coefficient for the selected tap includes the blind coefficient for the selected tap, and the feed forward coefficient for the tap preceding the selected tap includes a difference between the blind coefficient for the selected tap and the blind coefficient for the tap preceding the selected tap.

There is further provided, according to a preferred embodiment of the present invention, a method for equalization, including:

providing a plurality of taps in an equalizer, each tap including a multiplier which is coupled to multiply a respective input sample by a respective coefficient;

arranging the taps in sequence so that the input sample to each of the taps, except to a first tap in the sequence, is delayed relative to a preceding tap in the sequence; and toggling the input sample to at least a selected tap among the plurality of taps, responsive to a state of the equalizer, so that the equalizer operates in a first state as a feed forward equalizer, and in a second state as a blind equalizer.

The method preferably includes:

receiving an error signal as an input;

determining the respective coefficient to be applied to each of the taps responsive to the error signal, wherein the error signal is provided in the second state by the selected tap; and toggling the input sample to the selected tap so that in the second state the input sample to the selected tap includes a differential signal.

Preferably, the differential signal includes a difference between the input sample to the selected tap and the input sample to the tap preceding the selected tap.

Preferably, at least one of the respective coefficients is zero.

The method preferably also includes, in the first state of the equalizer, providing the error signal from a slicer.

The method preferably also includes:

operating the equalizer in the second state so as to determine the respective coefficient as a blind coefficient; and determining a feed forward coefficient of the equalizer responsive to the blind coefficient, when the equalizer is operative in the first state.

Preferably, the feed forward coefficient for the selected tap includes the blind coefficient for the selected tap, and the feed forward coefficient for the tap preceding the selected tap includes a difference between the blind coefficient for the selected tap and the blind coefficient for the tap preceding the selected tap.

The present invention will be more fully understood from the following detailed description of the preferred embodiments thereof, taken together with the drawings, in which:

DETAILED DESCRIPTION OF PREFERRED EMBODIMENTS

Figure 1:
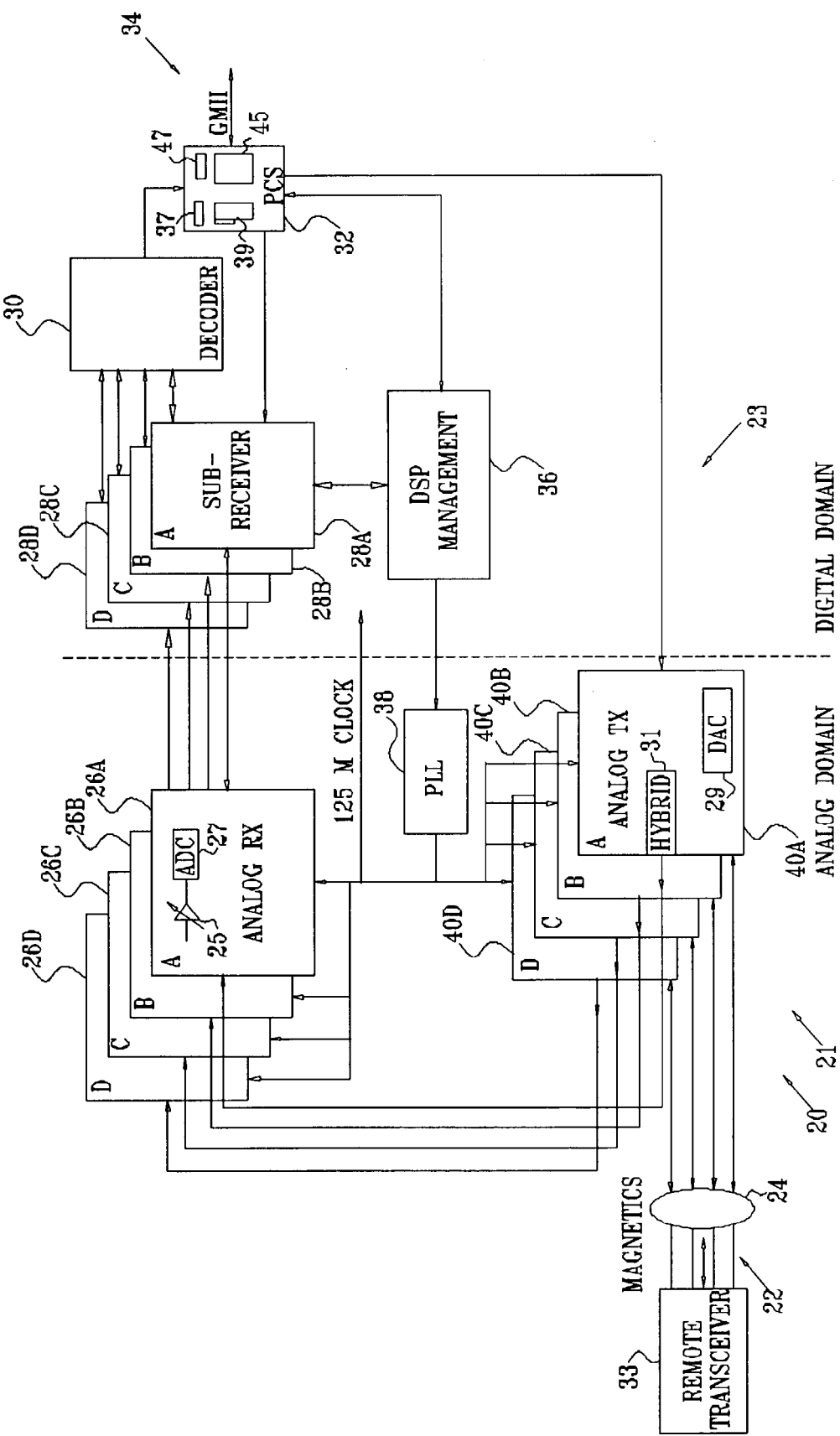
FIG. 1 is a schematic block diagram of a transceiver, according to a preferred embodiment of the present invention.

Reference is now made to FIG. 1, which is a schematic block diagram of a transceiver 20, according to a preferred embodiment of the present invention. Transceiver 20 is most preferably implemented from one or more custom devices, such as one or more application specific integrated circuits (ASICs). Alternatively, transceiver 20 is implemented from semi-custom or discrete devices, or a combination of custom, semi-custom and/or discrete devices. Transceiver 20 is coupled to a communication line 22, comprising four twisted pairs of conductors preferably implemented as Category 5 cables, so as to transmit and receive data at rates of the order of 1 Gb/s. Alternatively, communication line 22 may be implemented by other methods, known in the art, for conveying data at these rates. The data is transmitted as five-level pulse amplitude modulation (PAM-5) signals, according to an Ethernet protocol described in IEEE standard 802.3ab, each of the pairs of conductors transmitting and receiving data at an effective rate of 250 Mb/s by conveying two-bit symbols at a rate of 125 Msymbols/s. A transformer 24, also known as a magnetics section, acts as a coupling interface between transceiver 20 and line 22.

Transceiver 20 communicates via line 22 with a remote transceiver 33, which is coupled to the line and which operates according to the Ethernet protocol. Transceiver 33 is preferably implemented substantially as described herein for transceiver 20. Alternatively, transceiver 33 comprises any transceiver which operates according to the Ethernet protocol. As described in the protocol, an initialization phase, when transceivers 20 and 33 are to communicate, comprises an auto-negotiation stage followed by a start-up stage which may include an equalization stage. During these stages, transceivers 20 and 33 agree on which transceiver is to act as a master in the ensuing communication, and which transceiver is to act as a slave. The transceiver which is assigned to be the master starts to transmit immediately. The slave starts to transmit after completing the equalization stage.

Transceiver 20 consists of a substantially analog section 21, and a substantially digital section 23. Analog section 21 comprises four substantially similar analog transmitter modules 40A, 40B, 40C, and 40D, each of which transmits data to one of the conductor pairs in line 22. Transmitter modules 40A, 40B, 40C, and 40D are also collectively referred to herein as transmitter module 40. Each module 40 receives digital data from a physical coding sub-layer (PCS) 32, and converts the digital data to analog two-bit symbols using a digital to analog converter (DAC) 29 present in each module. The conversion is performed every 8 ns, according to a single 125 MHz clock signal received from a phase locked loop clock generator (PLL) 38, the single clock signal providing a common shared clock domain within which elements of transceiver 20 operate.

Analog section 21 also comprises four substantially similar analog receiver modules 26A, 26B, 26C, and 26D, each of which receives data from one of the conductor pairs in line 22. Receiver modules 26A, 26B, 26C, and 26D are also collectively referred to herein as receiver module 26. In order to reduce interference between each transmitter module 40 and its corresponding receiver module 26, each transmitter module includes a programmable hybrid circuit 31. The hybrid circuit conveys a delayed portion of a transmitted signal from each transmitter module 40 to the respective receiver module 26, the receiver module using the delayed portion to reduce echo in the received signal. Such methods for reducing echo are known in the art.

A variable gain amplifier (VGA) 25 in each receiver module 26 receives the signal from its respective conducting pair, and adjusts the signal level to a value suited to a respective following analog to digital converter (ADC) 27. Each ADC 27, preferably a 7 bit flash ADC, receives the 125 MHz clock generated by PLL 38 and performs sampling at 4 ns intervals, so generating two samples for each clock period of 8 ns. The two samples are transferred, in parallel, for processing in digital section 23, as is described below.

It will be appreciated that by sampling each ADC 27 with the same clock signal, no fluctuation between sampling times of analog receiver modules 26 occurs, not even short-term fluctuations. In contrast, receivers using separate clocks to sample each receiver will of necessity experience at least short-term fluctuations between clock signals. Because of the absence of fluctuations between sampling times, there is substantially no interference between conducting pairs in line 22, and near end cross talk (NEXT) cancellation is thus significantly improved, especially at clock frequencies.

Raw digitized samples produced by each ADC 27 in receiver modules 26A, 26B, 26C, and 26D are transferred to respective sub-receiver modules 28A, 28B, 28C, and 28D, herein collectively referred to as sub-receiver module 28, in digital section 23. Each sub-receiver 28 processes the raw digitized samples in order, inter alia, to generate initial five-level values for a subsequent decoder 30, common to all sub-receivers. Decoder 30 uses the five-level values to generate a combined output which is transferred to PCS 32, and from there to a Gigabit Media Independent Interface (GMII).

Each sub-receiver 28 also generates information for controlling attenuation levels of hybrid circuit 31 (in the corresponding transmitter module 40) and VGA 25 (in the corresponding receiver module 26). In addition, each sub-receiver 28 generates information which is used within a digital signal processing (DSP) management block 36 for setting a phase of PLL 38, when transceiver 20 acts as a slave, as is described in more detail below.

Figure 2:
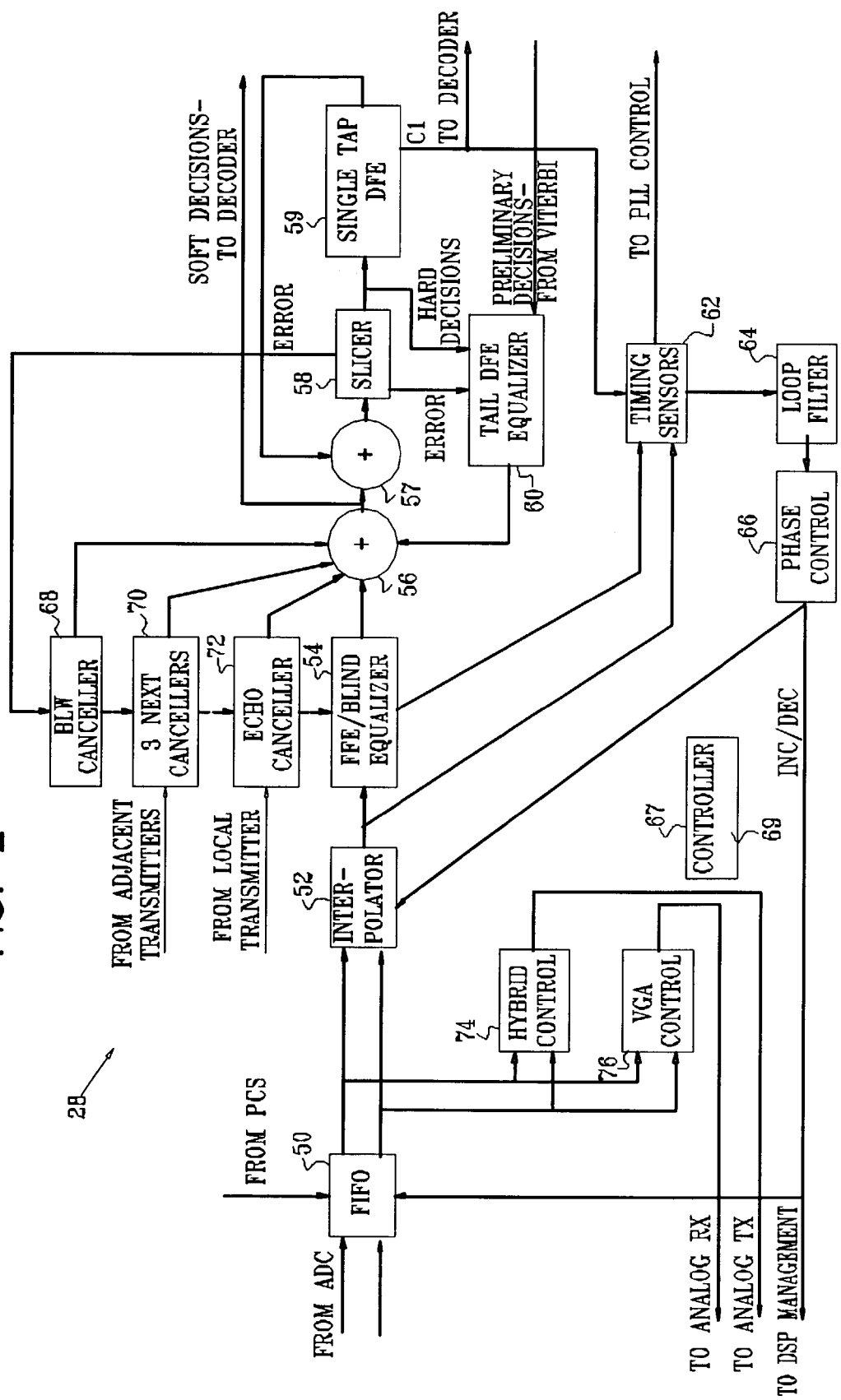
FIG. 2 is a schematic block diagram of a sub-receiver module in the transceiver, according to a preferred embodiment of the present invention.

FIG. 2 is a schematic block diagram of sub-receiver module 28, according to a preferred embodiment of the present invention. Each sub-receiver 28 comprises a controller 67 which operates elements of the sub-receiver. Each sub-receiver 28 comprises a first-in-first-out (FIFO) memory 50 which stores the two samples received every 8 ns from respective ADC 27. During operation of transceiver 20, each FIFO 50 is used as a buffer enabling each of the four channels to be approximately aligned before further processing of signals stored in each FIFO is performed. It will be appreciated that such approximate alignment is necessary, since especially for extended runs of line 22, considerable skew, of the order of fifty nanoseconds, may occur between pairs of conductors of line 22. The approximate coarse alignment is provided by an increment/decrement signal from a phase control block 66, described in more detail with reference to FIG. 11. FIFO 50 also receives alignment data from PCS 32. Preferred embodiments of the present invention most preferably use a method for determining skew as described with reference to FIGS. 23–25 below.

A fractionally spaced interpolator (FSI) 52 receives two samples per symbol, within an 8 ns period, from its respective FIFO 50. The FSI interpolates the two samples, and outputs one interpolated result at a phase derived from phase control block 66. The FSI also provides fine alignment to further correct skew occurring between pairs of conductors. By interpolating the samples, the interpolator improves the signal to noise ratio (SNR) of the signals by 3 dB, and also eliminates clock frequency noise.

Figure 3:
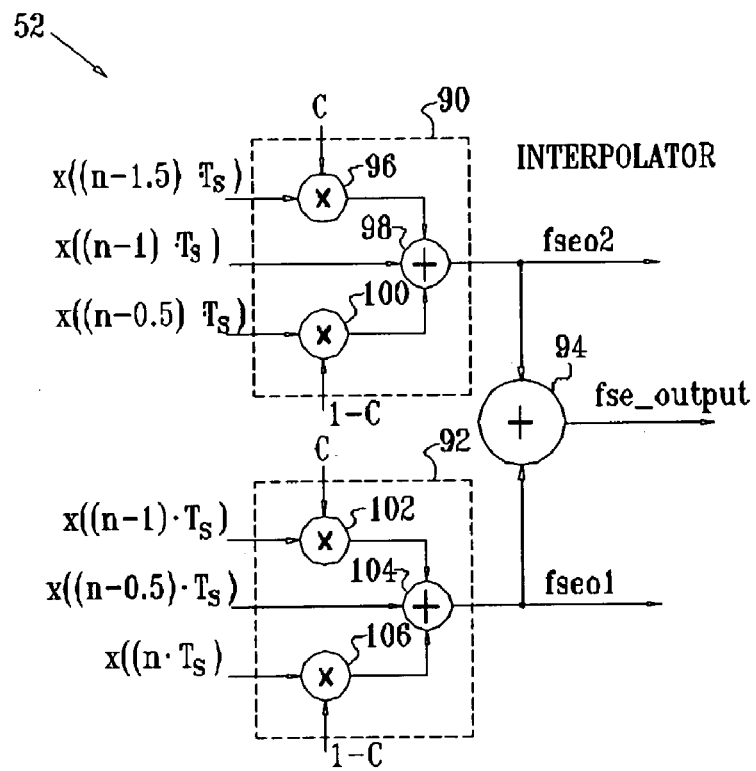
FIG. 3 is a schematic block diagram of a fractionally spaced equalizer in the sub-receiver, according to a preferred embodiment of the present invention.

FIG. 3 is a schematic block diagram of FSI 52, according to a preferred embodiment of the present invention. FSI 52 comprises two substantially similar processing blocks 90 and 92, each comprising a pair of multipliers, 96, 100 and 102, 106, feeding respective summers 98 and 104. During each clock cycle of $T_s$=8 ns, FSI 52 receives two samples $x(n \times T_s)$ and $x((n-0.5) \times T_s)$ generated in the cycle, and two samples $x((n-1) \times T_s)$ and $x((n-1.5) \times T_s)$ generated in the previous cycle, where n is a whole number and x(p) corresponds to a level of the sample at a time p. FSI 52 also receives a value of an interpolation coefficient "c" from phase control block 66.

Processing block 90 operates on samples $x((n-0.5) \times T_s)$, $x((n-1) \times T_s)$ and $x((n-1.5) \times T_s)$ to produce an output fse_o2 $(n \times T_s)$ given by equation (1):

$$fse\_o2 = c \cdot x((n-1.5) \times T_s) + x((n-1) \times T_s) + c \cdot x((n-0.5) \times T_s) \quad (1)$$

Processing block 92 operates on samples $x(n \times T_s)$, $x((n-0.5) \times T_s)$, and $x((n-1) \times T_s)$ to produce an output fse_o1$(n \times T_s)$ given by equation (2):

$$fse\_o1 = c \cdot x((n-1) \times T_s) + x((n-0.5) \times T_s) + (1-c) \cdot x(n \times T_s) \quad (2)$$

A linear interpolation of the four samples is produced by adding fse_o1$(n \times T_s)$ and fse_o2$(n \times T_s)$ in a summer 94 to produce an output fse_out$(n \times T_s)$ given by equation (3):

$$fse\_out = c \cdot x((n-1.5) \times T_S) + (1+c) \cdot x((n-1) \times T_S) + (2-c) \cdot x((n-0.5) \times T_S) + (1-c) \cdot x(n \times T_S) \quad (3)$$

Outputs fse_o1$(n \times T_s)$ and fse_o2$(n \times T_s)$ are used as control inputs for a timing sensors block 62 (FIG. 2); output fse_out $(n \times T_s)$ is transferred to an equalizer 54, which performs further filtration on the signal. The outputs are produced every 8 ns.

The interpolation provided by FSI 52 uses a relatively simple system of interpolation wherein the interpolator, in addition to providing interpolation, acts as a low-pass filter and removes clock frequency noise completely. The filtration provided by FSI 52, when taken with a later adaptive equalizer of transceiver 20, substantially completely equalizes the channel it is operating on. It will be appreciated that the simple implementation of FSI 52, taken together with the later equalizer, provides a complete solution for equalizing the channel.

Figure 4:
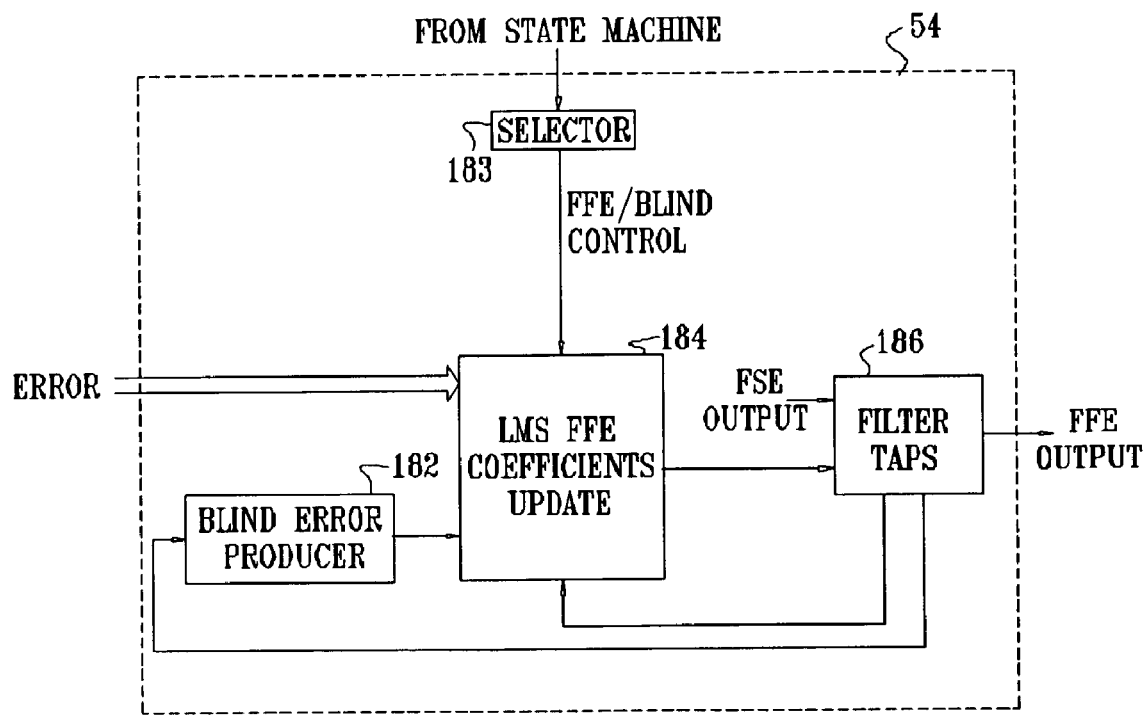
FIG. 4 is a schematic block diagram of a combined feed forward and blind equalizer in the sub-receiver, according to a preferred embodiment of the present invention.

FIG. 4 is a schematic block diagram of equalizer 54, according to a preferred embodiment of the present invention. Equalizer 54 comprises a programmable adaptive finite impulse response (FIR) filter, most preferably comprising fourteen taps, which may be implemented as either a blind adaptive equalizer or as a feed forward adaptive equalizer (FFE). A block 186 conceptually represents all taps of the FIR. Equalizer 54 also comprises a least mean squares (LMS) FFE coefficients update block 184 which receives an FFE/Blind control input and, responsive to the control input, provides outputs to block 186 of the filter. The control input is preferably toggled between an FFE value and a Blind value by a selector 183. Selector 183 in turn receives an input from a state machine 69, operated by controller 67, which controls operations of transceiver 20 during start-up of the transceiver. Alternatively, the state machine may be configured to provide the FFE/Blind control input directly, in which case the state machine acts as selector 183.

The control input configures equalizer 54 to operate as a blind equalizer when the equalizer is beginning to receive communications from remote transceiver 33, i.e., after the initialization phase (described above) between transceiver 20 and transceiver 33 has completed, and during a start-up phase of transceiver 20. The control input configures equalizer 54 to operate as an FFE when conditions in the blind equalizer configuration have stabilized, whereupon transceiver 20 enters an operational phase. Equalizer 54 also comprises a blind error producer 182, which generates a blind error value when the equalizer operates as a blind equalizer.

Figure 5:
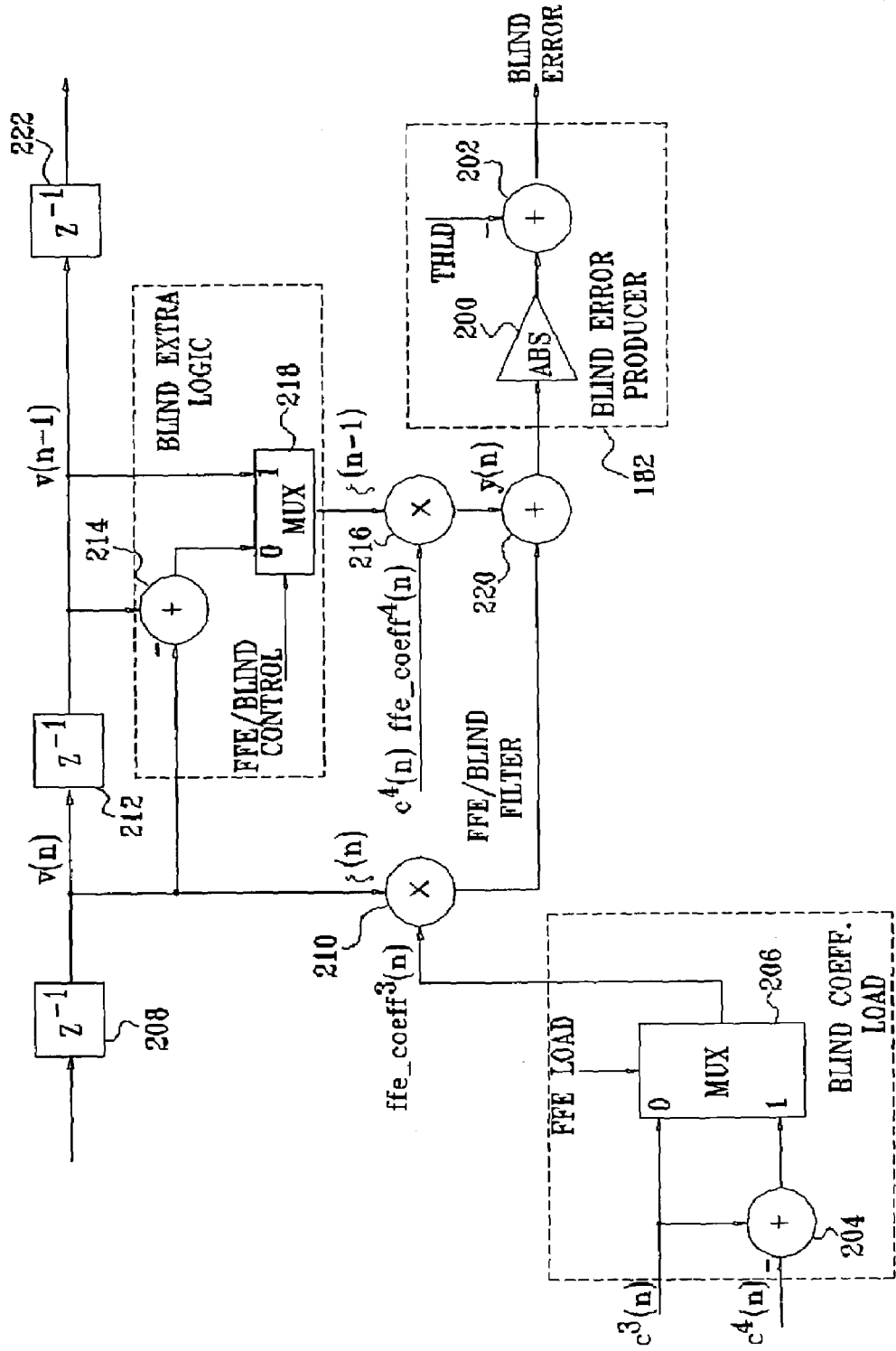
FIG. 5 shows configurations for third and fourth taps of the equalizer of FIG. 4, and a configuration of a blind error producer of the equalizer, according to a preferred embodiment of the present invention.

FIG. 5 shows configurations for third and fourth taps of equalizer 54, and blind error producer 182, according to a preferred embodiment of the present invention. The third and fourth taps, the latter acting as a main tap, are included in filter taps block 186. For clarity, only registers 208, 212, and 222, corresponding to third, fourth, and fifth time delays for the FIR, are shown in FIG. 5. All other taps of the FIR are preferably configured according to a standard configuration for FIR taps known in the art.

Initially, when transceiver 20 is not receiving a signal, i.e., when remote transmitters which would normally provide the transceiver with a signal are inactive, all tap coefficients of equalizer 54 are set to zero, apart from fourth tap coefficient $c^4(n)$, which is set equal to 4. Setting all tap coefficients to zero, apart from setting the fourth tap coefficient to 4, enables the filter to operate substantially transparently without performing equalization. Thus, coefficient $c^3(n)$ is set to a value 0 and is applied via the "0" path of a multiplexer 206 to a multiplier 210. Also, the "0" path of a multiplexer 218 is activated, so that a summer 214 is used.

Figure 6:
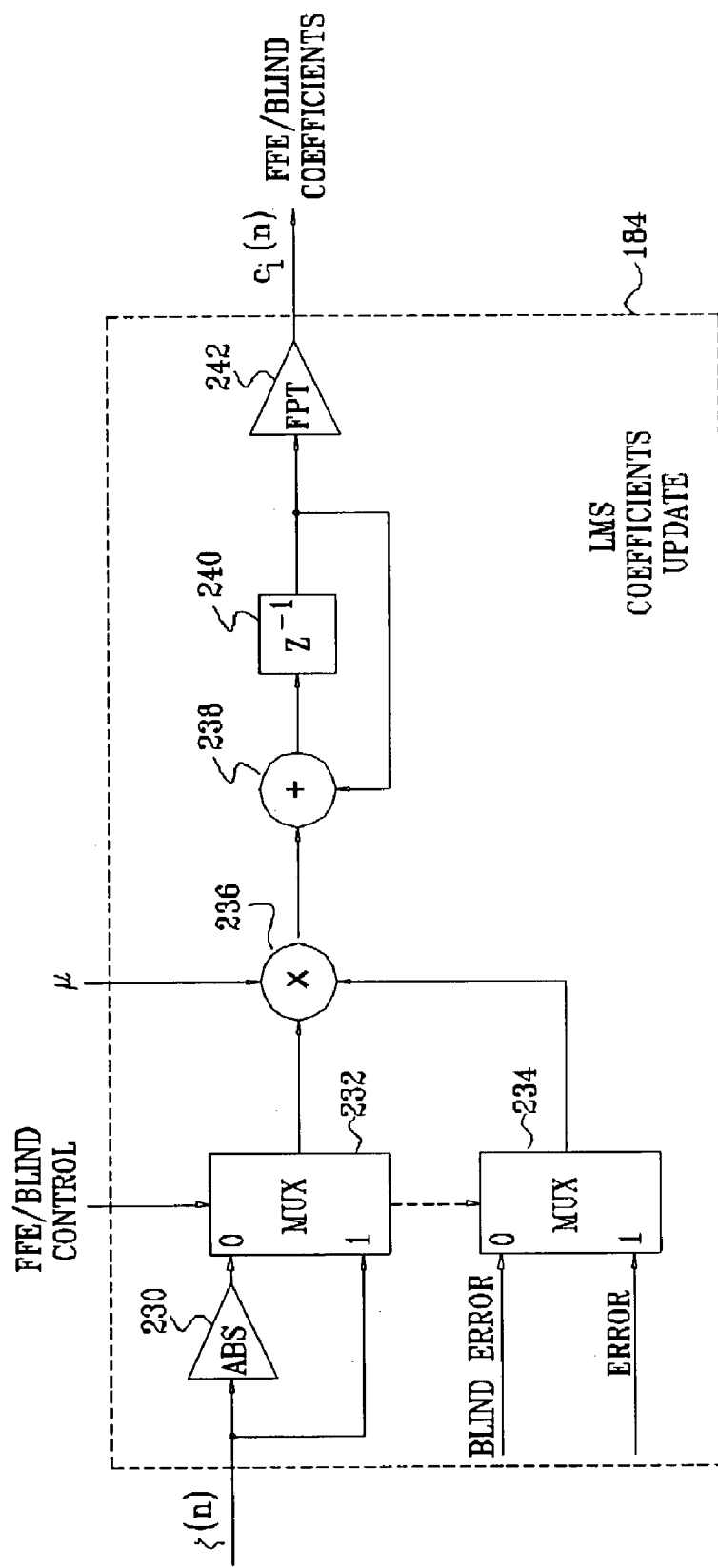
FIG. 6 is a diagram showing detail of a least mean square coefficients update block of the equalizer of FIG. 4, according to a preferred embodiment of the present invention.

FIG. 6 is a diagram showing detail of LMS coefficients update block 184 of equalizer 54, according to a preferred embodiment of the present invention. Block 184 updates coefficients in equalizer 54, when the equalizer operates as a blind equalizer or as an FFE equalizer, using an input $\xi(n)$. Operating as a blind equalizer, an absolute value of $\xi(n)$ is generated in an absolute-value device 230, and paths "0" in multiplexers 232 and 234 are followed, multiplexer 234 receiving a blind error signal generated from a summer 202 (FIG. 5), as described below. Operating as an FFE equalizer, paths "1" are followed, multiplexer 234 receiving an error signal from a slicer 58, via a baseline wander (BLW) canceller 68, three near end cross-talk (NEXT) cancellers 70 (each for the non-corresponding transmitters 40 of transceiver 20) and an echo canceller 72 for the corresponding transmitter of the transceiver. BLW canceller 68 may be implemented as any canceller known in the art. NEXT cancellers 70 and echo canceller 72 are described below with reference to FIGS. 13–21. Slicer 58 is also described in more detail below. The values from multiplexers 232 and 234 are fed to a multiplier 236 which also receives a value of a constant $\mu_{blind}$ or $\mu_{ffe}$, depending whether the equalizer is operated as a blind or an FFE equalizer. In a preferred embodiment of the present invention, $\mu_{ffe}$ has an approximate value of $2^{-7}$, and $\mu_{blind}$ has an approximate value of $2^{-5}$.

Multiplier 236 outputs its value to a summer 238, a register 240 which provides a time delay and which feeds back to the summer, and a fixed point transformation (FPT) converter 242 to give a final coefficient output $c^i(n+1)$:

$$c^i(n+1) = c^i(n) + \mu_{type} \cdot err(n) \cdot \xi(n) \quad (4)$$

where i is a coefficient index and n is a time index;

$\mu_{type}$ is $\mu_{blind}$ or $\mu_{ffe}$, according to the operational state of the equalizer;

err(n) is the blind or the FFE error signal; and $\xi(n)$ is the signal value v(n), after time n, derived from time delays such as delay 208 or 212 (FIG. 5).

Returning to FIGS. 2, 4 and 5, when a signal is initially received, equalizer 54 operates as a blind equalizer and searches for optimal initial coefficients ffe_coeff$^i$(n), which are then used to operate the equalizer as an FFE equalizer.

In the blind equalizer, summer 214 generates a difference signal v(n−1)−v(n), from signals v(n) and v(n−1) after delays 208 and 212 respectively. The difference signal is used as $\xi(n-1)$ in equation (4), as is also shown in FIG. 5. The difference signal is multiplied by $c^4(n)$ in a multiplier 216, and the result, y(n), is transferred via a summer 220 to blind error producer 182. The value y(n) is given by:

$$y(n) = \xi(n) \cdot c^3(n) + [v(n-1) - v(n)] \cdot c^4(n) \tag{5}$$

where the terms on the right side of equation (5) correspond to the output from multipliers 210 and 216 respectively.

In producer 182 a blind error, err(n), is determined by subtracting a threshold THLD value from |y(n)| (|y(n)| is generated in device 200) in a summer 202:

$$err(n) = |y(n)| - THLD \tag{6}$$

The value of THLD is set according to whether the particular sub-receiver 28 comprising equalizer 54 operates as a master or as a slave. If the sub-receiver operates as a master THLD is set to be approximately 1.8. If the sub-receiver operates as a slave, THLD is set to be approximately 1.7.

Coefficient $c^3(n)$ is updated using equation (4). Coefficient $c^4(n)$ is modified using "differential" adaptation based on a value of (v(n−1)−v(n)), as shown in equation (5).

Equalizer 54 continues to operate as a blind equalizer until coefficients generated by the equalizer have converged to approximately constant values. At this point the equalizer is converted to an FFE equalizer by allowing paths "1" in multiplexer 206 and 218 to be followed, and by using the following transformations at the time of change-over:

$$ffe\_coeff^3(n) = c^3(n) - c^4(n), ffe\_coeff^4(n) = c^4(n), ffe\_coeff^i(n) = 0, i \neq 3,4. \tag{7}$$

Returning to FIG. 2; equalizer 54 provides an output (after delay 222 (FIG. 5) and subsequent delays) to a first summer 56. Summer 56 adds correcting factors to the output, and generates a "soft" decision, corresponding to a first approximation of the received signal level. The correcting factors are received from the BLW, NEXT, and Echo cancellers, and from a "tail" decision feedback equalizer (DFE) 60, described in more detail below. The soft decision is input to decoder 30, and is also adjusted in a second summer 57, which receives feedback from a single tap DFE 59, and the adjusted first approximation is transferred to slicer 58. Slicer 58 compares levels received from second summer 57 with ideal levels corresponding to 2, 1, 0, −1, and −2, and chooses the closest of these as a "hard" decision level. Slicer 58 also calculates an error value between the level received from summer 56 and the hard output level. The hard decisions are used as an input to single tap DFE 59 and tail DFE 60, and also for adaptation. The error signal is used as a feedback input to equalizer 54, as described above, and also to tail DFE 60.

Equalizer 54, when operating as an FFE equalizer, removes all the inter-symbol interference (ISI) caused by the symbol transmitted two cycles ago, i.e., the symbol prior to an immediately previous symbol. This allows each sub-receiver 28 to have a DFE without a second tap, i.e., having a second coefficient set effectively to zero, as is described in more detail below with respect to FIG. 7. In addition to reducing hardware, setting the second coefficient of the DFE to zero simplifies the complexity of multiple DFEs comprised in decoder 30 by a factor of five, compared to implementations where the second coefficient of the DFE is non-zero, as is also explained in more detail below with respect to FIG. 9.

Figure 7:
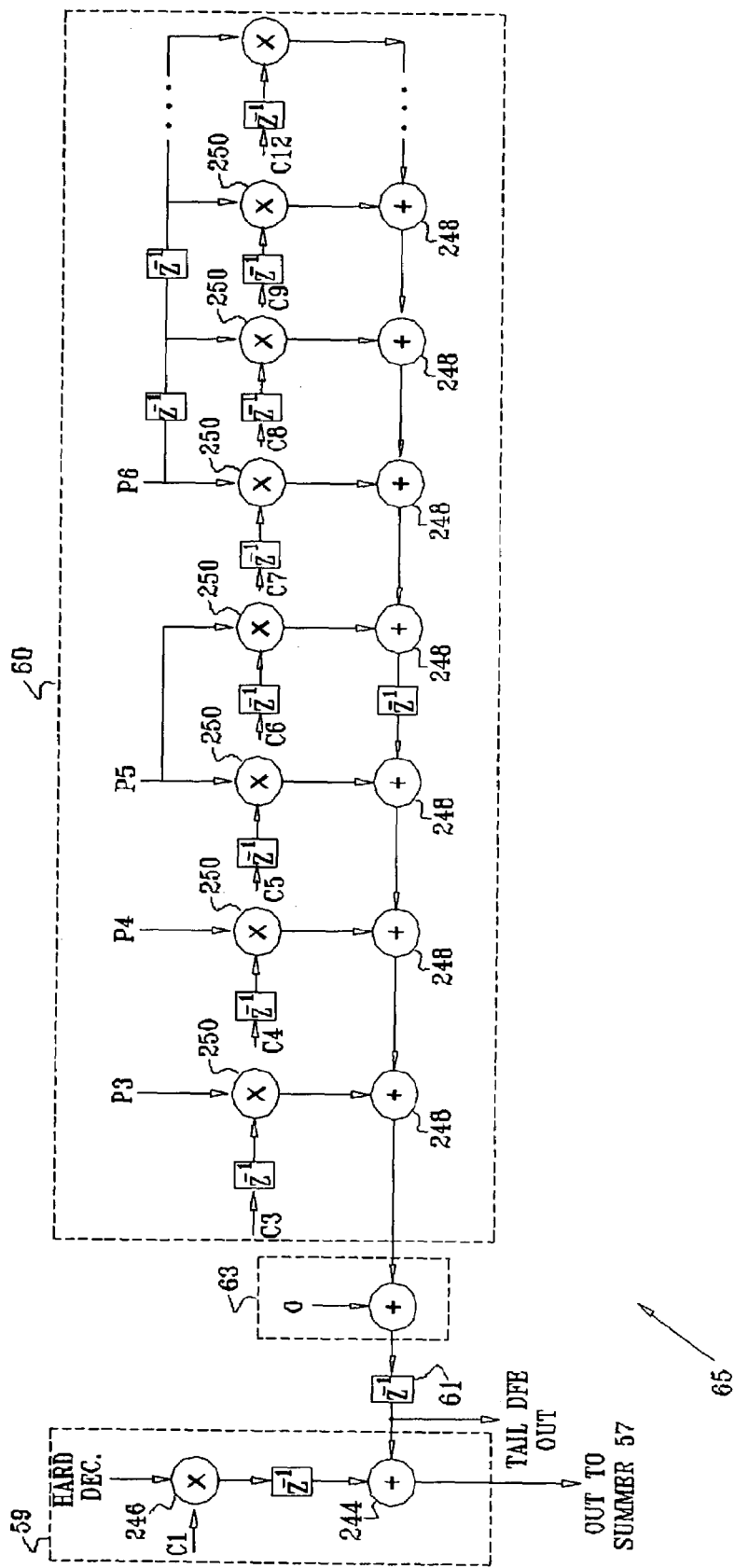
FIG. 7 is a schematic block diagram of a single tap decision feedback equalizer (DFE) and of a "tail" DFE, according to a preferred embodiment of the present invention.

FIG. 7 is a schematic block diagram of single tap DFE 59 and tail DFE 60, according to a preferred embodiment of the present invention. DFE 59 and DFE 60 respectively comprise a first single tap section and a second multi-tap "tail" section of a combined DFE 65. DFE 65 receives preliminary equalized output from slicer 58 and provides further equalization in the form of feedback to summers 56 and 57, in response.

Single tap 59 comprises a summer 244 and a multiplier 246. Multiplier 246 receives a hard decision from slicer 58 and a first coefficient C1, and their product is input to summer 244 after a delay of a single clock cycle. Summer 244 also receives the delayed output of tail DFE 60, via a register 61, as described below. The summer's output is used as an input to summer 57.

DFE 60 comprises ten substantially similar taps, a third tap to a twelfth tap, the third and fourth taps receiving respective preliminary decisions P3, P4, from a Viterbi decoder in decoder 30, the fifth and sixth taps receiving a preliminary decision P5, and the seventh to twelfth taps receiving a preliminary decision P6. Each tap comprises a summer 248, and a multiplier 250 which also receives a coefficient C3, . . . , C12. The output of tail DFE 60 is provided, via a register 61 providing a time delay, to summer 56 wherein it is subtracted. The delayed output of DFE 60 is also provided to single tap DFE 59. A second tap 63 of combined DFE 65 has a coefficient set to zero, so that the second tap of the combined DFE comprises substantially only a time delay, with no coefficient multiplication.

Figure 8:
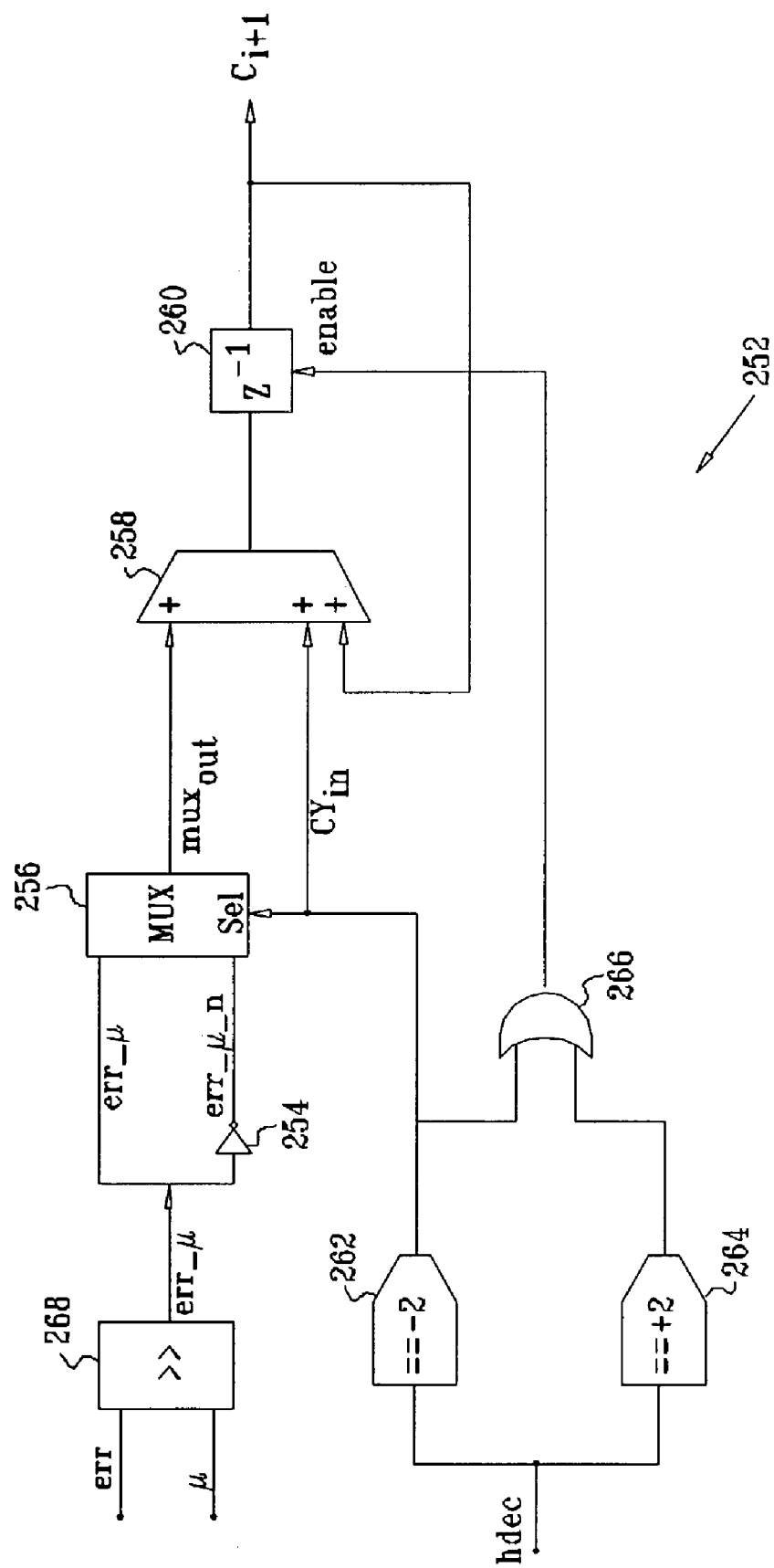
FIG. 8 is a schematic block diagram of a coefficient generator, according to a preferred embodiment of the present invention.

FIG. 8 is a schematic block diagram of a coefficient generator 252, according to a preferred embodiment of the present invention. (A generator generally similar to generator 252 may be used for Echo canceller 72 and/or for NEXT cancellers 70.) Each of coefficients C1, C3, . . . , C12, herein termed Cn, is produced by a substantially similar coefficient generator block 252. Each block 252 comprises a right-shifter 268 which receives the error signal "err" from slicer 58 as well as a value of a constant μ which determines a number of places by which err is shifted right. The right shifted error signal err_μ is input to a multiplexer 256, which also receives an inverted value err_μ_n formed by an inverter 254.

Block 252 also receives the hard decision, herein termed $h_{dec}$, produced by slicer 58. As described below, block 252 alters a value of coefficients Cn if $|h_{dec}|$ is 2; if $|h_{dec}|$ is not 2, Cn is unaltered. In comparators 262 and 264 $h_{dec}$ is evaluated and outputs of the comparators feed an OR gate 266. Gate 266 outputs 1 if $|h_{dec}|=2$, and 0 if $|h_{dec}| \neq 2$. The output $cy_{in}$ of comparator 262, checking if $h_{dec}$ is −2, is also input as a select signal to multiplexer 256. The output $mux_{out}$ of multiplexer 256 is err_μ_n if $h_{dec}$ is −2, otherwise $mux_{out}$ is err_μ.

A summer 258 receives outputs from multiplexer 256, comparator 262, and a time delay 260. Delay 260 receives the output of gate 266, and is enabled if the output is 1. The output of block 252 is thus given by equations (8a) and (8b):

$$C_{i+1} = C_i + mux_{out} + cy_{in} \; (|h_{dec}|=2) \tag{8a}$$

$$C_{i+1} = C_i \; (|h_{dec}| \neq 2) \tag{8b}$$

Figure 9:
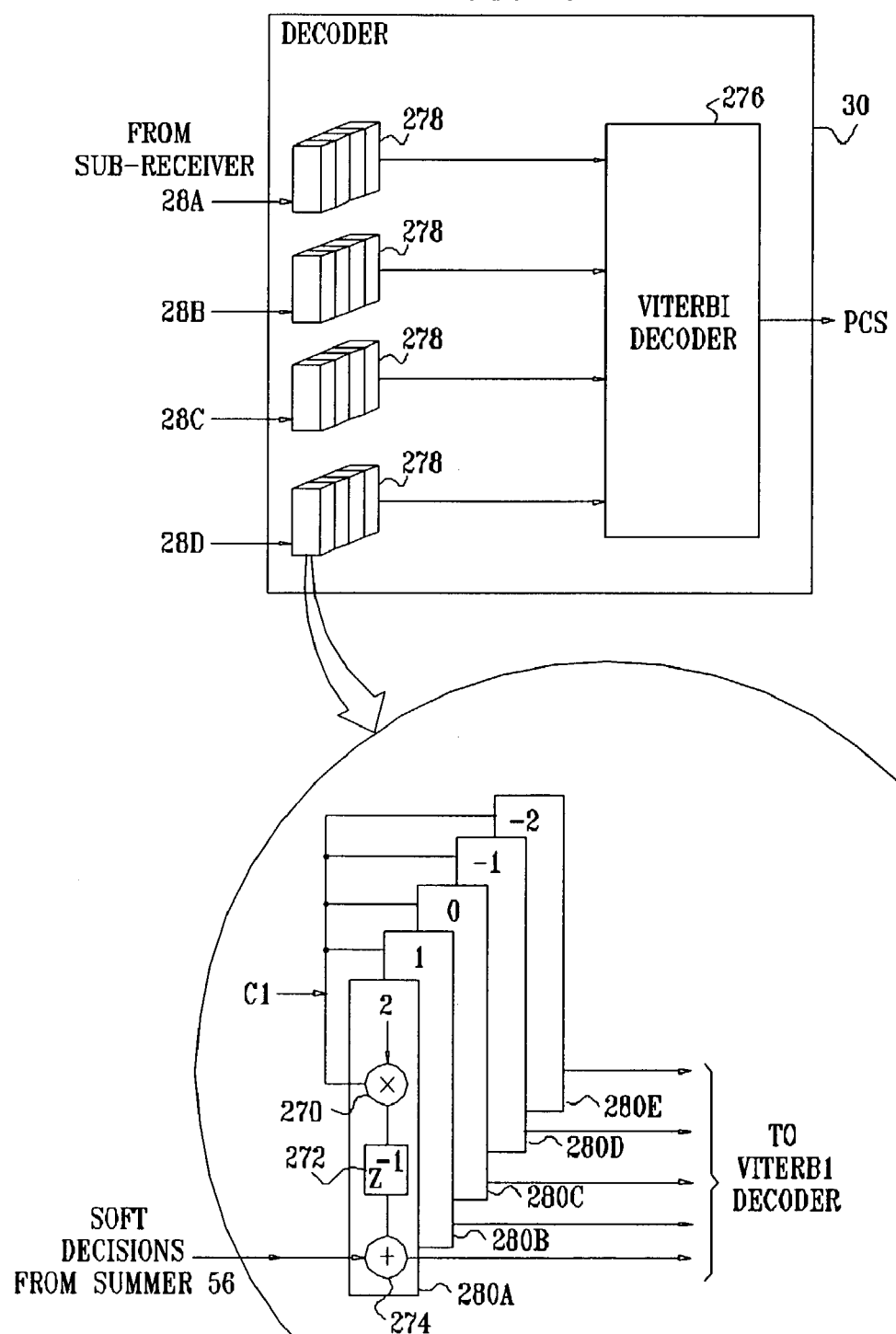
FIG. 9 is a schematic block diagram of a decoder in the transceiver of FIG. 1, according to a preferred embodiment of the present invention.

FIG. 9 is a schematic block diagram of a decoder 30 (FIG. 1), according to a preferred embodiment of the present invention. Decoder 30 comprises four substantially similar multiple DFE (MDFE) channels 278 and a Viterbi decoder 276. Each MDFE channel 278 receives data from a respective sub-receiver 28, and is constructed from five generally similar first DFE taps 280A, 280B, 280C, 280D, and 280E, also referred to generically hereinbelow as tap 280. Each tap 280 comprises a multiplier 270, a register 272, and a summer 274. In each tap 280 multiplier 270 multiplies coefficient C1 by a different PAM-5 reference level {−2,−1,0,1,2}, and the result, delayed by a clock cycle in register 272, is transferred to a summer 274. Summer 274 also receives soft decisions from summer 56 and provides its output to Viterbi decoder 276.

The five parallel first DFE taps 280A, 280B, 280C, 280D, and 280E of decoder 30 for each channel of the decoder, while receiving five-level data from two cycles, need to predict only five possible levels of an existing symbol, rather than 25 combinations as is described in prior art systems such as that of U.S. Pat. No. 6,192,072, to Azadet, referred to in the Background of the Invention, so that the complexity of the MDFEs is correspondingly reduced.

Figure 10:
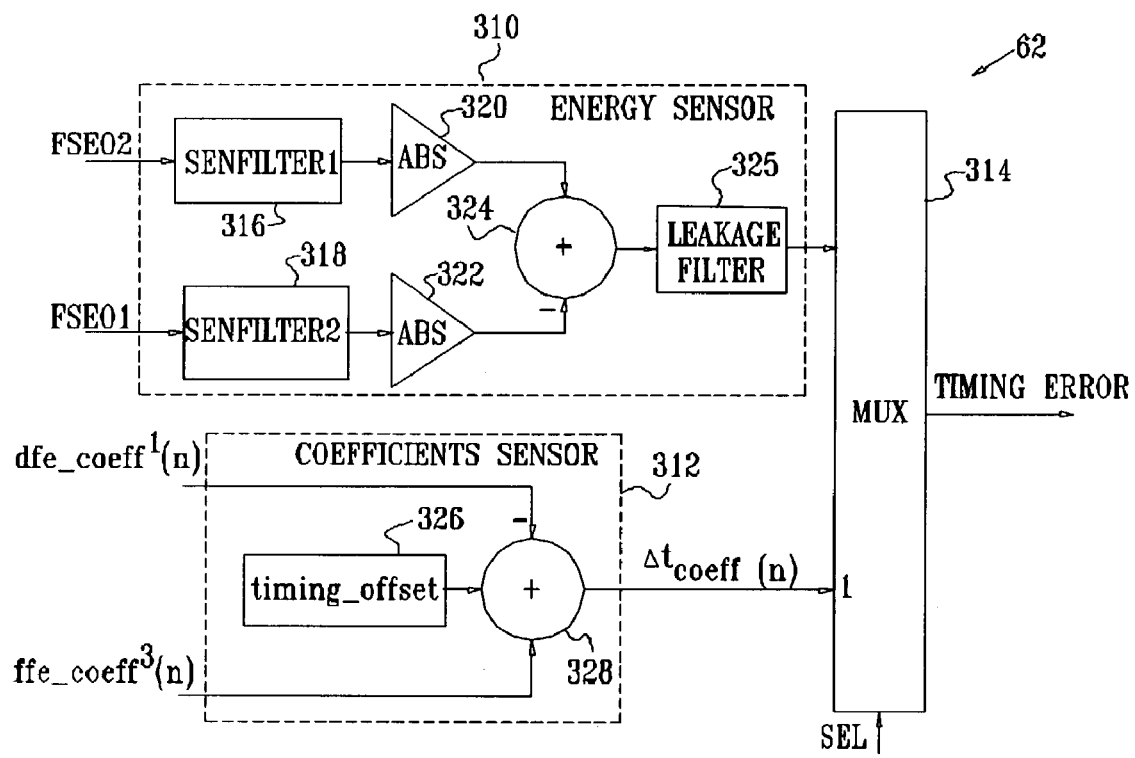
FIG. 10 is a schematic diagram of a timing sensors block, according to a preferred embodiment of the present invention.

FIG. 10 is a schematic diagram of timing sensors block 62, according to a preferred embodiment of the present invention. Block 62 comprises two sensors, an energy sensor 310 and a coefficients sensor 312. Energy sensor 310 receives its inputs from FSI 52 (FIG. 3). Coefficients sensor 312 most preferably receives, from DFE 65 the first coefficient of DFE 65 (FIG. 7), i.e., the coefficient C1 of single tap DFE 59, and the third coefficient of FFE 54 (FIGS. 4 and 5) i.e., the coefficient before the main tap. In some preferred embodiments of the present invention coefficients sensor 312 receives an alternative indication of the coefficients, such as a change in value of the coefficients. During operation of a sub-receiver one of the two sensors is chosen by the specific sub-receiver 28 to generate a timing error signal, which is in turn used to control a phase of FIFO 50 and FSI 52 of the sub-receiver. The four timing errors from all sub-receivers 28 are also used, via DSP management block 36 (FIG. 1), to generate a phase control signal for PLL 38 when the transceiver operates as a slave.

In energy sensor 310 inputs fseo2 and fseo1 are respectively filtered in filters 316 and 318, and an absolute value of each filtered output is generated in devices 320 and 322. Filters 316 and 318 are implemented to emphasize their inputs, and preferably have a transfer function given by equation (9):

$$\frac{1-z^{-1}}{1+\frac{1}{3}z^{-1}} \quad (9)$$

where $z^{-1}$ represents a delay of one clock cycle.

A summer 324 calculates the difference between the two absolute outputs, the difference is filtered in a leakage filter 325, and transferred to a multiplexer 314. It will be appreciated that the difference (between the filtered values of fseo2 and fseo1) provides an error signal which is zero when fseo2 and fseo1 are equal.

Coefficients sensor 312 performs the operation given by equation (10):

$$\Delta t_{coeff}(n) = \text{ffe\_coeff}^3(n) - \text{dfe\_coeff}^1(n) - TO \quad (10)$$

where $\Delta t_{coeff}(n)$ is the timing error;
ffe_coeff$^3$(n) is the coefficient of the third tap of FFE 54;
dfe_coeff$^1$(n) is the coefficient of the tap of DFE 59, also referred to herein as C1;
TO is a timing offset.

As stated above, each sub-receiver may operate as a master or as a slave. As a master, TO is assigned to be between approximately −4 and −3. As a slave, once the coefficients of the equalizers have converged, TO is assigned to be equal to (ffe_coeff$^3$(n)−dfe_coeff$^1$(n)).

The output $\Delta t_{coeff}(n)$ is transferred to multiplexer 314. Multiplexer 314 selects between the two timing errors, from energy sensor 310 and coefficients sensor 312, depending on a state of operation of sub-receiver 28. If the sub-receiver is operating as a master only, the output from the coefficients sensor is used. If the sub-receiver operates as a slave, and there is no transmission from the corresponding transmitter 40, the output from the energy sensors is used, since there is substantially no echo noise. After the sub-receiver that is operating as a slave starts to transmit, the output from the coefficients sensor is used. The facility to switch between energy sensor 310 and coefficients sensor 312 significantly improves the robustness of operation of transceiver 20.

Figure 11:
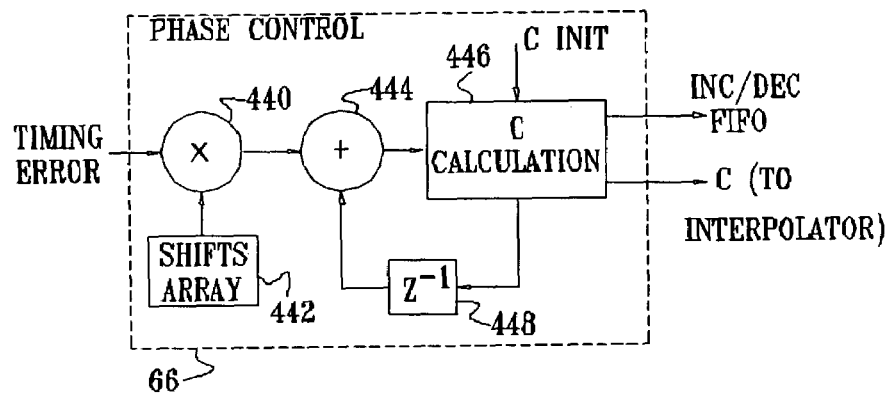
FIG. 11 is a schematic diagram of a phase control block, according to a preferred embodiment of the present invention.

FIG. 11 is a schematic diagram of phase control block 66, according to a preferred embodiment of the present invention. Block 66 computes a value of c, the FSI 52 interpolation coefficient. The selected timing error output from multiplexer 314 is input, via a filter 64, to a multiplier 440 in block 66, implemented as a shifter. Multiplier 440 also receives a shift coefficient from a shifts array 442, and multiplies the error according to the coefficient to generate a preliminary value of c. The shift coefficient may be different according to whether transceiver 20 is operating as a master or as a slave. In a preferred embodiment of the present invention the coefficient is assigned a value of 13 when transceiver 20 operates as a master, and a value of 7 when the transceiver operates as a slave.

The preliminary value of c is input to a summer 444, which also receives a delayed value of c from a calculation block 446 so as to provide integration of c. The summed result from summer 444 is output to a c calculation block 446, which outputs the value of c, and an increment (+1) or decrement (−1) signal which is sent to FIFO 50, according to table I below.

TABLE I

Figure 12:
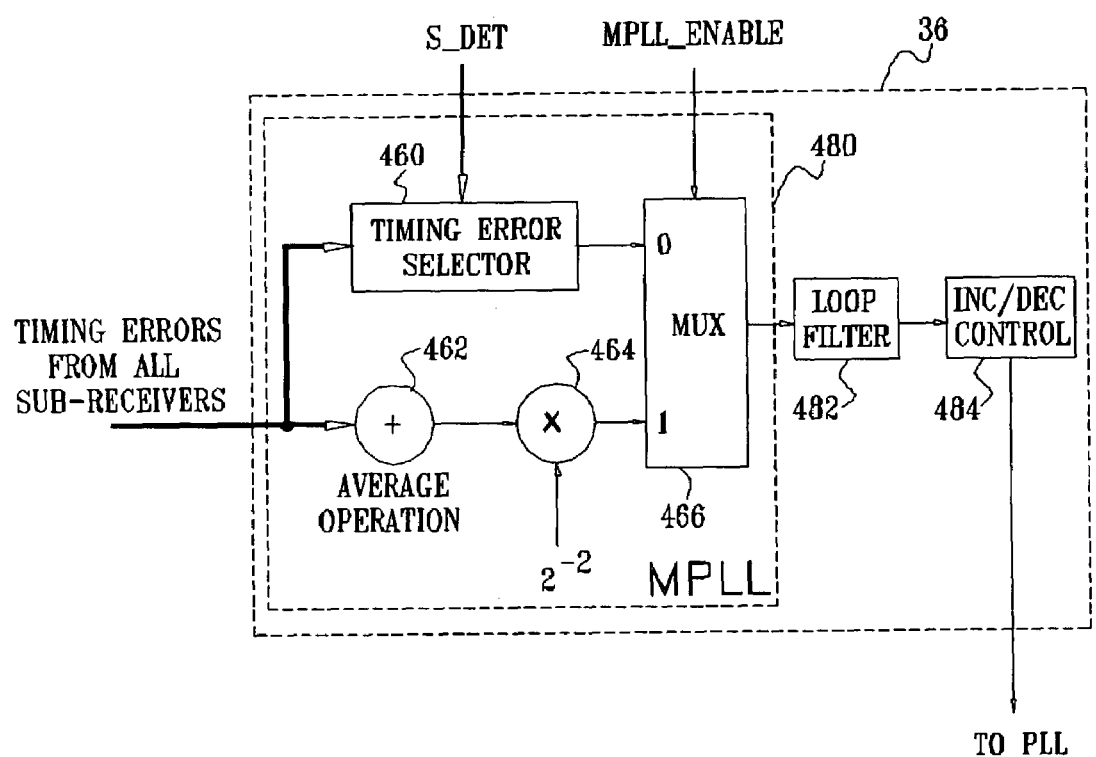
FIG. 12 is a schematic block diagram of a digital signal processing block, according to a preferred embodiment of the present invention.

| Initial c value | Increment/Decrement | c value output |
|---|---|---|
| c > 1 | −1 | 0 |
| c < 0 | +1 | 1 |
| 0 ≦ c ≦ 1 | 0 | c | c is then transferred to FSI 52, where it is used as described above with reference to FIG. 3. The value of the timing error from each sub-receiver 28 is also input to DSP block 36 (FIG. 1), for use in controlling timing error selection FIG. 12 is a schematic block diagram of DSP block 36, according to a preferred embodiment of the present invention. Block 36 comprises a multi-phase lock loop (MPLL) block 480, which provides an output that alters the phase of the clock generated by PLL block 38. MPLL block 480 receives in a summer 462 all the timing errors from each timing sensor 62 of sub-receivers 28. The errors are averaged, using a shift multiplier 464, and input to a multiplexer 466. In addition, all the timing errors are transferred to a timing error selector 460. Selector 460 is used after the initialization phase (described above) between transceiver 20 and transceiver 33 has completed, to choose the timing error from the sub-receiver 28 which has the signal with the best signal-to-noise value. The choice is made by a selection signal s_det.

Immediately after the initialization phase, multiplexer 466 selects and outputs the timing error from selector 460. Once the receiver has stabilized, i.e., the coefficients of each sub-receiver 28 have converged to approximately stable values, multiplexer 466 selects and outputs the averaged value of all the timing errors. The output of multiplexer 466 is transferred via a loop filter 482 to an increment/decrement control block 484, which receives the increment/decrement control provided to FIFO 50. Responsive to the multiplexer output, block 484 generates an increment or a decrement signal to alter the phase of PLL 38.

Returning to FIG. 1, PLL 38 provides a common shared clock domain which operates the whole of transceiver 20, i.e., both analog section 21 and digital section 23. In analog section 21 all A/D converters 27 are thus sampled at substantially the same time, which has the advantage, inter alia, of substantially reducing overall receiver complexity, compared to receivers which use more than one clock signal for their operation.

Figure 13:
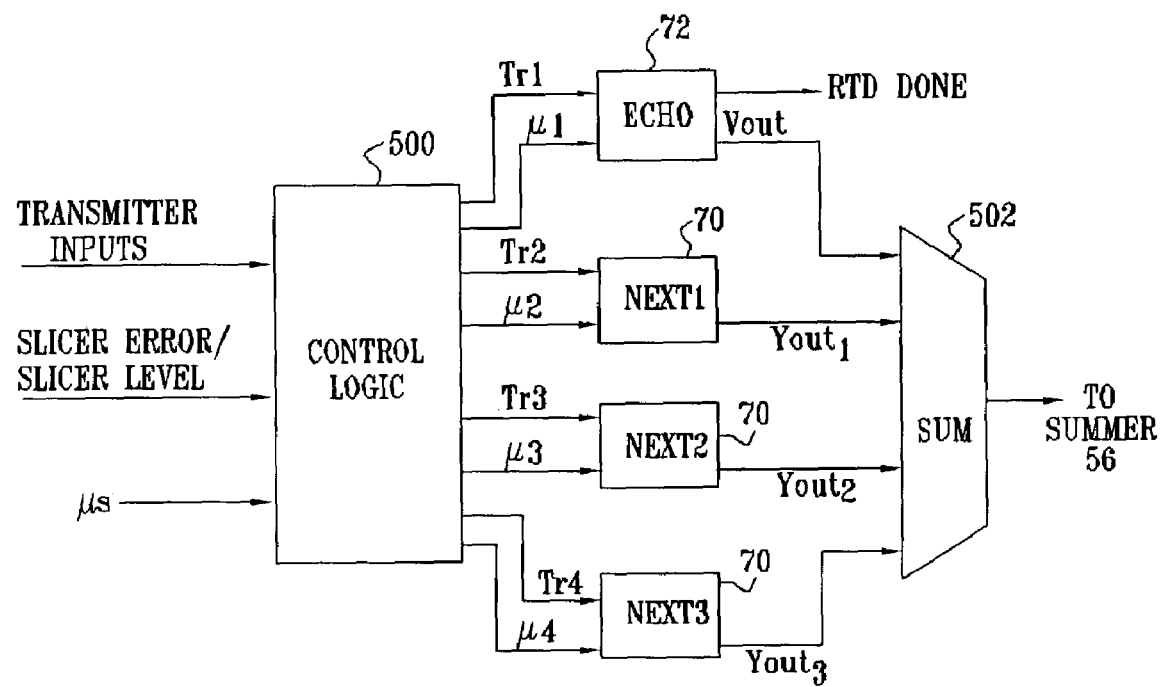
FIG. 13 is a schematic block diagram of near-end crosstalk (NEXT) cancellers, an echo canceller, and control logic associated with the cancellers, comprised in the sub-receiver module of FIG. 2, according to a preferred embodiment of the present invention.

FIG. 13 is a schematic diagram of NEXT cancellers 70 and echo canceller 72, and control logic associated with the cancellers, according to a preferred embodiment of the present invention. As described above with reference to FIG. 6, each receiver 26 comprises a respective echo canceller 72 and three NEXT cancellers 70. Control logic 500 receives transmit data from transmitters 40, and distributes the data to cancellers 70 and 72. Echo canceller 72 receives data from its receiver's corresponding transmitter, and NEXT cancellers 70 receive data from the three neighboring transmitters. In addition, control logic 500 receives adjustment parameters $\mu$, which the logic uses as coefficients to adjust the error used by the cancellers, and other parameters, described below, which adjust settings of the cancellers. The error to be adjusted is either the error output from slicer 58, or a level used by the slicer in making its decisions, depending on a state of receiver 26. If receiver 26 is in an initialization state, the error is set to be the level used by the slicer. If receiver 26 has completed its initialization state, the error is set to the error output from slicer 58.

The error is then right shifted by $\mu$, each $\mu$ preferably being set within a range from 9 to 16 depending on an adaptation step size desired. The values of $\mu$ are most preferably pre-set at implementation of receiver 28. How the values of $\mu$ are utilized is described in more detail below. In addition to the signals described above, control logic 500 receives other control inputs, also described below, for operation of cancellers 70 and 72. A summer 502, comprising registers, receives outputs from cancellers 70 and 72, and the summed output is input as described above to summer 56. As described below, echo canceller 70 also measures a round trip delay (RTD) of signals transmitted from a corresponding transmitter 40, and outputs a flag RTD_done which may be used by receiver 28 to determine if the receiver is in its initialization state.

Figure 14:
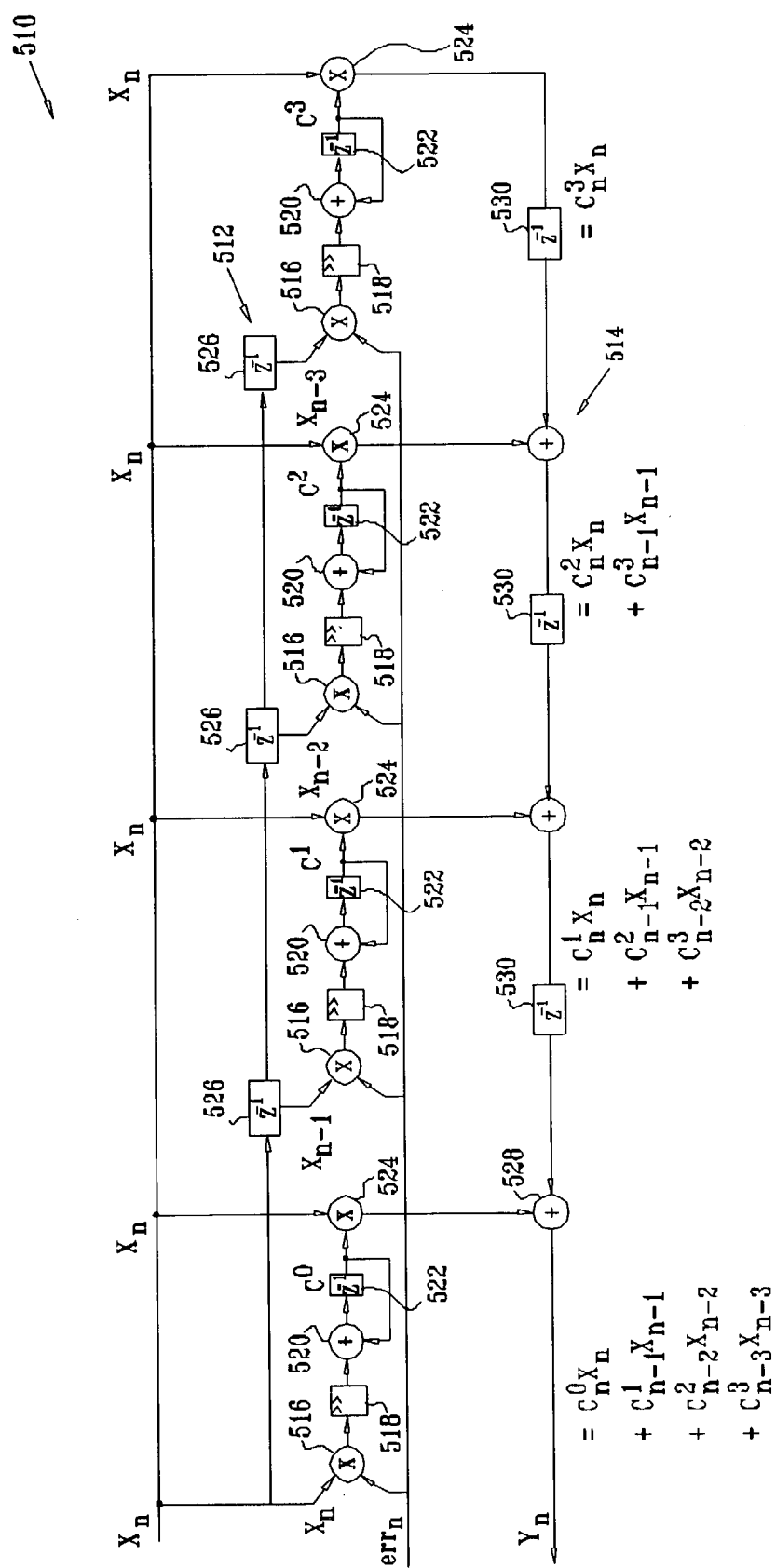
FIG. 14 is a schematic block diagram of an adaptive finite impulse response (FIR) filter, according to a preferred embodiment of the present invention.
Figure 15:
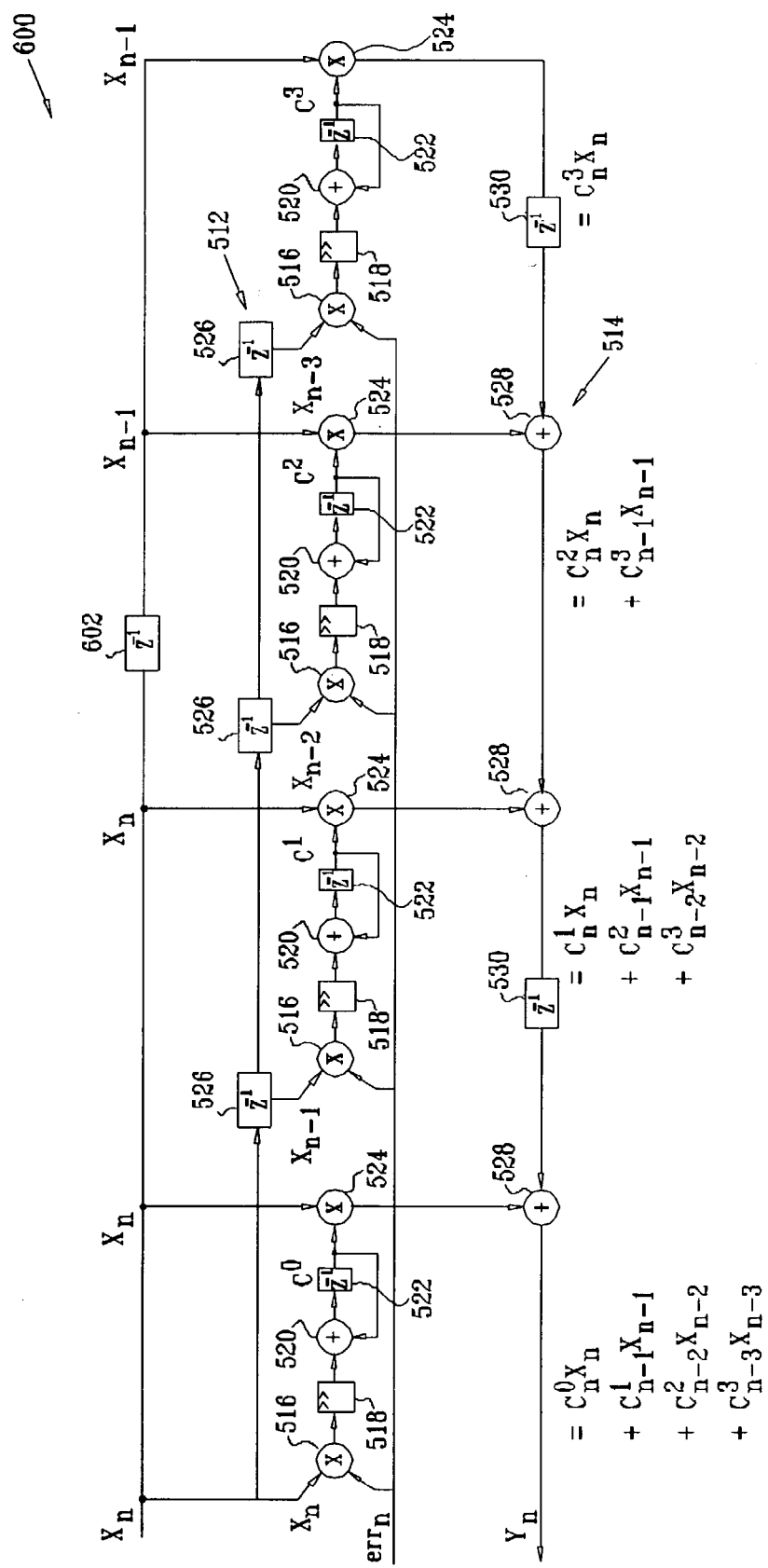
FIG. 15 is a schematic block diagram of an alternative adaptive FIR filter, according to a preferred embodiment of the present invention.
Figure 16:
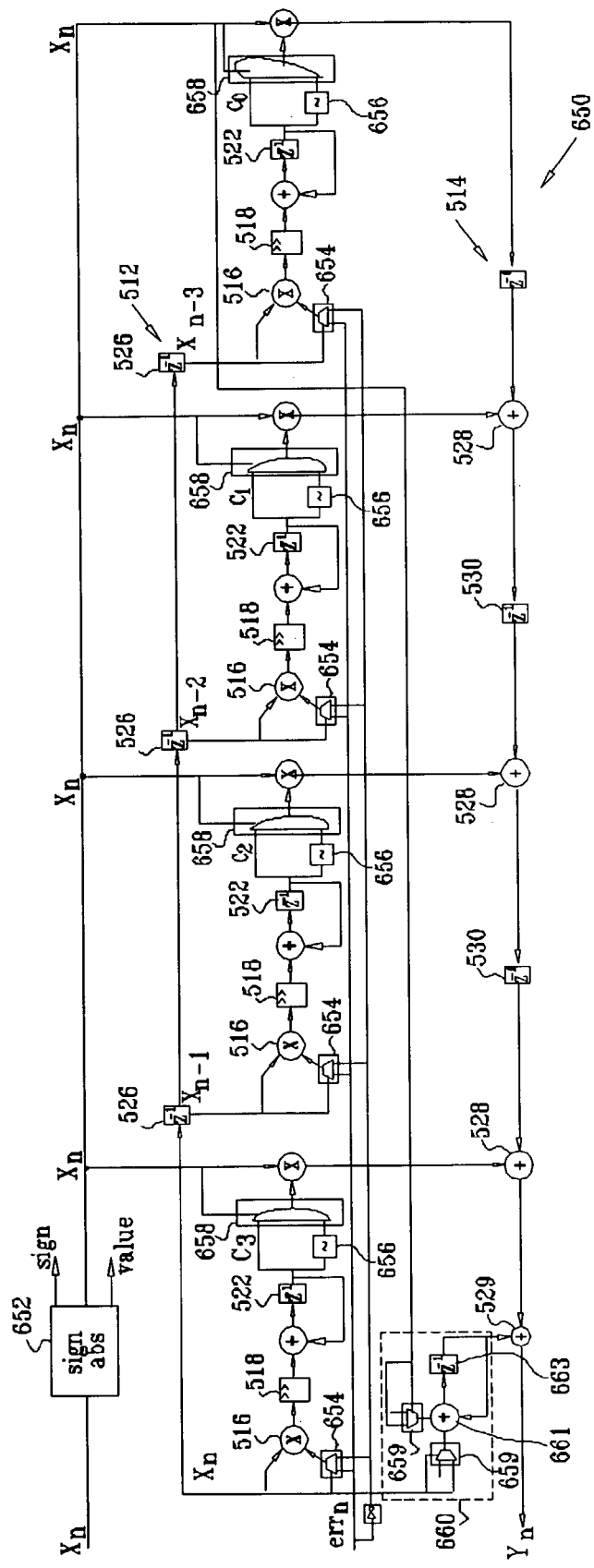
FIG. 16 is a schematic block diagram of yet another adaptive FIR filter, according to a preferred embodiment of the present invention.

Echo canceller 70 and NEXT cancellers 72 are implemented from adaptive finite impulse response (FIR) filters. FIGS. 14–16, described hereinbelow, schematically illustrate types of filters used in receiver 28.

FIG. 14 is a schematic block diagram of an adaptive FIR filter 510, according to a preferred embodiment of the present invention. Filter 510 has four taps arranged in a transpose–form architecture, as is known in the art, and comprises an adaptation pipeline 512 and an equalization pipeline 514. Adaptation pipeline 512, wherein coefficients are adaptively calculated, consists of a series of multipliers 516, shifters 518, adders 520, delays 522, and multipliers 524. Each section of pipeline 512, except the first section, also consists of a time delay 526. Equalization pipeline 514 consists of a series of adders 528 and delays 530.

Each section of adaptation pipeline 512 computes a coefficient of the form:

$$C_{n+1}{}^m = C_n{}^m + err_n \cdot x_n \cdot 2^{-\mu} \tag{10}$$

where m is a coefficient index;

n is a time index;

$C_{n+1}{}^m$ is a new coefficient;

$C_n{}^m$ is a previous coefficient;

$err_n$ is an error value;

$x_n$ is an input to filter 510; and $\mu$ is a positive integer giving an adaptation step size.

The output of equalization pipeline 514, i.e., the value output by the leftmost adder 528, is given by $$y_n = C_n{}^0 \cdot x_n + C_{n-1}{}^1 \cdot x_{n-1} + C_{n-2}{}^2 \cdot x_{n-2} + C_{n-3}{}^3 \cdot x_{n-3} \tag{11}$$

where $x_{n-p}$ is a value of $x_n$ delayed by p cycles.

FIG. 15 is a schematic block diagram of an adaptive FIR filter 600, according to a preferred embodiment of the present invention. Filter 600 has a hybrid-form architecture which combines the transpose-form architecture of filter 510 and a direct-form adaptive FIR architecture, which is known in the art. Apart from the differences described below, the operation of filter 600 is generally similar to that of filter 510, so that elements indicated by the same reference numerals in both filters 510 and 600 are generally identical in construction and in operation. Unlike filter 510, filter 600 does not have a delay 530 in every section of the equalization pipeline, but has a delay 602 at the input of later taps of the filter. Filter 600 has a hybrid factor of 2, (the number of consecutive tap outputs that can be combined into the same register) and the output of the filter is given by:

$$y_n = C_n{}^0 \cdot x_n + C_{n-1}{}^1 \cdot x_{n-1} + C_{n-1}{}^2 \cdot x_{n-2} + C_{n-2}{}^3 \cdot x_{n-3} \tag{12}$$

The hybrid form of FIR architecture has a number of advantages, known in the art, compared to the transpose-form architecture illustrated in FIG. 12. In general, a hybrid-form filter with a hybrid factor of N has, for every N taps, N−1 input signals feeding a single tap and 1 input signal feeding two taps. As is also known in the art, a preferable value of N is given by N=$2^M$−1, where M is a positive integer. Furthermore, input registers may be utilized to serve a dual purpose of adaptation and equalization.

Multipliers 524 in adaptive FIR filters of preferred embodiments of the present invention most preferably use ones complement multiplication in each tap of the filter. Using ones complement arithmetic reduces both area and power requirements compared to implementing twos complement arithmetic. An accumulator is used to adjust the final result, as shown in the following derivation.

Equations (11) and (12) may be represented by:

$$Y_n = \sum_{i=0}^{N} X_{n-i} \cdot C_n^i \tag{13a}$$

which may be separated into positive $X_n^+$ and negative $X_n^-$ values to give:

$$Y_n = \sum_{i=0}^{N} X_{n-i}^+ \cdot C_n^i + \sum_{i=0}^{N} X_{n-i}^- \cdot C_n^i \quad (13b)$$

When $X_n$ is negative, this can be rewritten:

$$Y_n = \sum_{i=0}^{N} X_{n-i}^+ \cdot C_n^i + \sum_{i=0}^{N} \left| X_{n-i}^- \right| \cdot C_n^i \quad (13c)$$

which can be further rewritten to:

$$Y_n = \sum_{i=0}^{N} X_{n-i}^+ \cdot C_n^i + \sum_{i=0}^{N} \left| X_{n-i}^- \right| \cdot [\sim C_n^i] + \sum_{i=0}^{N} \left| X_{n-i}^- \right| \cdot 2^{-f} \quad (13d)$$

where $\sim C_n$ in the second term in equation (13d) is the ones complement of coefficient $C_n$, f is a number of fractional bits in $C_n$, and the last term in equation (13d) is the adjustment needed for using ones complement arithmetic.

FIG. 16 is a schematic block diagram of an adaptive FIR filter 650, according to a preferred embodiment of the present invention. Filter 650 uses ones complement arithmetic, has a transpose-form architecture, and is implemented to operate substantially as described above with respect to equation 13d. Apart from the differences described below, the operation of filter 650 is generally similar to that of filter 510, so that elements indicated by the same reference numerals in both filters 650 and 510 are generally identical in construction and in operation. An element 652 determines a sign and an absolute value of $X_n$ and these are used by later sections of the filter. Filter 650 comprises selectors 654, 658, and a ones complement generator 656, in each tap, which enable the tap to implement ones complement arithmetic. Selectors 654 and 658 make their selection according to a control signal also input to the selector. For example, each selector 658 selects between $C_n$ and $\sim C_n$ according to the sign of $X_n$ input, used as the control signal, to the selector.

Filter 650 further comprises elements which act as an accumulator 660 for adjusting the overall result from the filter, enabling the filter to implement equation (13d). Accumulator 660 comprises selectors 659 that operate generally as selectors 654 receiving $X_n$ and $X_{n-M}$, a summer 661 that sums the output of selectors 659, and a register 663 that inserts a delay into the output of the summer. Accumulator 660 is implemented to produce the adjustment corresponding to the last term of equation (13d), enabling filter 650 to transform back from ones complement to twos complement arithmetic. When an input $X_n$ is negative its absolute value is added to accumulator 660; when data $X_{n-M}$ leaving a last tap of the filter is negative, its absolute value is subtracted from the accumulator. The adjustment is added to the filter output in an adjustment-adder 529, which produces a final filter output. Those skilled in the art will be able to formulate a schematic, generally similar to that of FIG. 14 for filter 650, but having a hybrid-form or a direct-form architecture.

Echo canceller 72 and NEXT cancellers 70 preferably comprise hybrid-form or transpose-form FIR filters generally similar to filter 650. As described in more detail below with reference to FIG. 17, the numbers of taps and the hybrid factors of the FIR filters comprising the cancellers are set for each of the filters.

As stated above, input data to NEXT cancellers 70 and Echo canceller 72 are five-level signals $\{+2, +1, 0, -1, -2\}$. Some preferred embodiments of the present invention perform adaptation when values of the input are 2 or –2, and not for the other three values. In the initialization phase of receiver 28, inputs to the cancellers are also set to be +2, 0, or –2, so that during this phase there is no effect on the adaptation. After completion of the initialization phase, performing adaptation using only the +2 and –2 levels leads to significant savings of chip area and chip power consumption with minimal reduction in adaptation performance. The minimal reduction is due to the fact that most of the energy of the input values resides in the +2 and –2 levels.

During the initialization phase of receiver 28, filter coefficients of NEXT cancellers 70 and Echo canceller 72 are most preferably adapted without decimation. Once the initialization phase has concluded, however, the coefficients typically tend to vary relatively slowly, so that adaptation decimation may be implemented with relatively little loss of efficiency. Preferred embodiments of the present invention preferably implement adaptation decimation in a substantially random manner over time, so as to minimize any frequency dependent adaptation factor. Most preferably, the randomness is introduced by cyclically counting the number of +2 or –2 values on the input data. Each time the counter returns to a specific value, e.g., 0, the next +2 or –2 value is used for adaptation. The value is used one tap at a time, i.e., the value "traverses" the adaptation pipeline so that at a time $t_n$ it is used for tap 1, at a time $t_{n+1}$ it is used for tap 2, and continues until the last tap. Most preferably, the adaptation rate generated by the counter is monitored, and in the event of the adaptation rate falling below a minimum frequency, the counter is overridden and adaptation is enforced for the next +2 or –2 input value, so ensuring a minimum adaptation rate.

In transferring the five levels $\{+2, +1, 0, -1, -2\}$ between elements of the cancellers, the levels are encoded as binary strings. Toggling between the binary values because of level changes, as data is transferred, uses power. Some preferred embodiments of the present invention use an encoding scheme for the levels and strings defined by the following one-one relationship: $\{(\text{level, string})\} = \{(+2, 010), (+1, 001), (0, 000), (-1, 100), (+1, 110)\}$.

The encoding is a mapping between the two parameters level and string, and is also shown in Table II below.

TABLE II

| Level | String |
|---|---|
| +2 | 010 |
| +1 | 001 |
| 0 | 000 |
| −1 | 100 |
| −2 | 110 |

Analysis of the encoding of Table II shows that a total of 32 transitions occurs for toggling between any level value to any other level value. The total of the transitions forms a measure of a switching activity value that would be caused by toggling between the levels in a random manner, as is typically the case when data is transferred. A prior art encoding scheme encodes −1 as 111, other encoding values being as given in Table II. Using the encoding scheme of Table II leads to a significant saving in numbers of transitions needed for toggling between any two data levels, and thus to a reduction in switching activity value, compared to the prior art scheme. The reduction in switching activity value leads to a corresponding reduction in power used.

Figure 17:
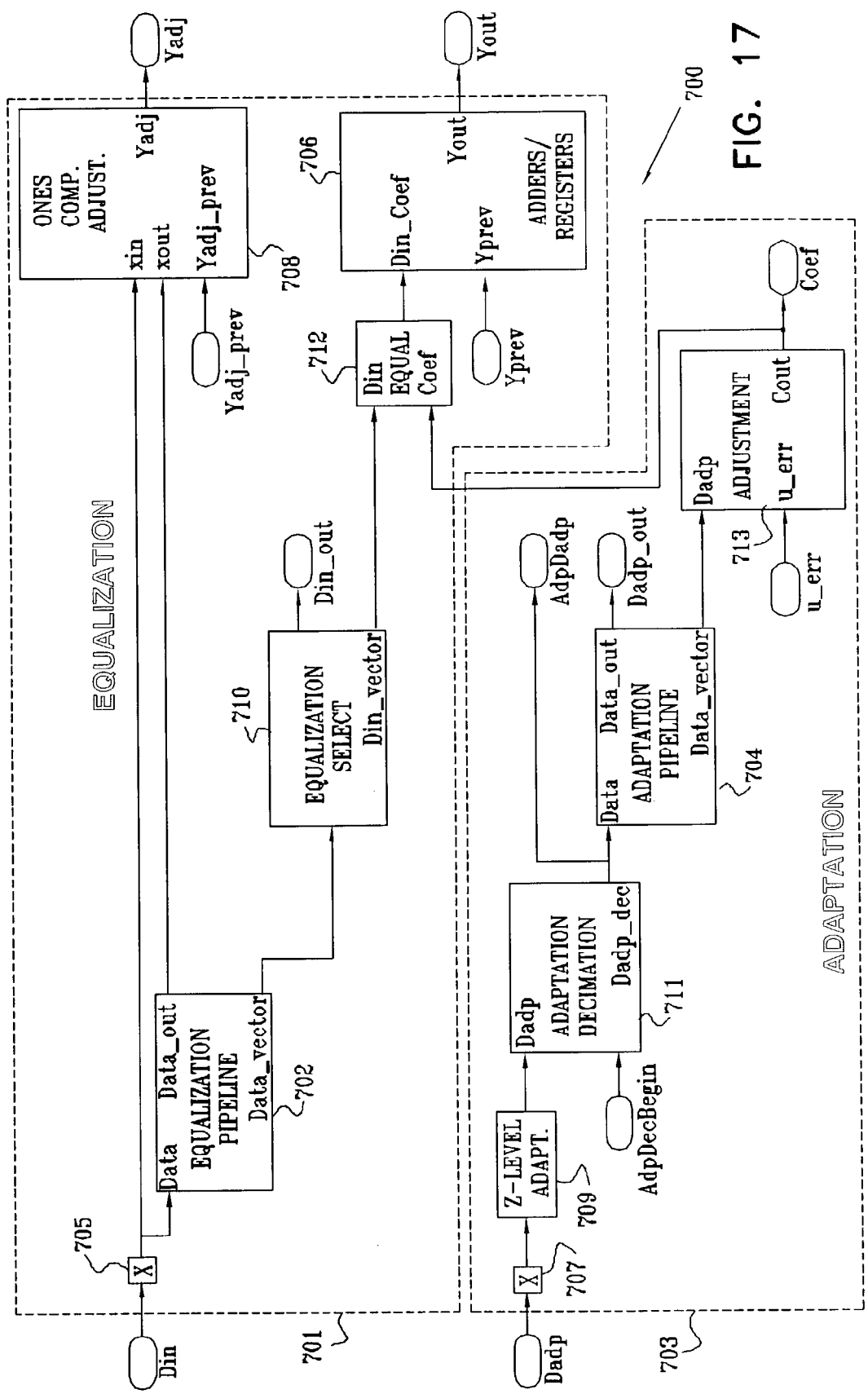
FIG. 17 is a schematic block diagram of a structure of an adaptive FIR filter, according to a preferred embodiment of the present invention.

FIG. 17 is a schematic block diagram of a structure 700 of an adaptive FIR filter, according to a preferred embodiment of the present invention. Structure 700 illustrates a general format of FIR filters comprised in Echo canceller 72 and each of NEXT cancellers 70. Structure 700 may be considered to be comprised of two regions, an equalization region 701 and an adaptation region 703. Equalization region 701 functions generally as equalization pipelines 514 (FIGS. 14, 15, and 16), and adaptation region 703 functions generally as adaptation pipelines 512. Most preferably, where possible registers in delay lines of both regions are combined to reduce redundant registers, so as to reduce power dissipation and chip area used. The number of taps for each delay line is detailed below in the respective descriptions for each canceller.

Equalization region 701 receives its raw data as one of five levels, $\{-2, -1, 0, +1, +2\}$, and translates the data in a translation block 705 as described above with reference to Table II. The translated data is input to an equalization pipeline block 702, which comprises a number of delays according to the hybrid factor selected, so that block 702 is followed by an equalization select block 710, wherein appropriately delayed input data is applied to the corresponding filter taps according to the hybrid factor.

Data from block 710 is input to an equalization block 712, wherein the data is multiplied by filter coefficients, derived from the adaptation region, using ones complement arithmetic, as described above. As also described above, the ones complement arithmetic requires an adjustment Yadj, which is performed by an accumulator comprised in an equalization adjustment block 708, substantially as described above with reference to FIG. 16 and equation (13d).

An adder-register block 706 comprises adders and registers of the output path of the filter. The number of adders and registers is a function of the hybrid factor of the filter, and adders are preferably combined where possible. For example, a hybrid factor of 7 ($2^3-1$) requires, in the output path, seven consecutive adders between every two registers. Each seven adders may be combined into one 8-adder with eight inputs—one input from each respective filter tap plus one input from a neighboring register holding a previous partial result. The adder-register block 706 outputs the final result Yout of filter 700, before adjustment by the output of equalization adjustment block 708. The two outputs may be combined to give a final output of filter 700, or, for example when filter 700 is cascaded with other similar filters, the two outputs may be kept separate, as described in more detail with reference to FIGS. 18A, 18B and 19A, 19B below.

Adaptation region 703 also receives its input data as one of five levels, $\{-2,-1,0,+1,+2\}$, and translates the data in a translation block 707, substantially similar to block 705, and the two blocks may be effectively combined to one block. The translated data is filtered through a 3-level adaptation block 709, which only transfers $\{-2,0,+2\}$, so that region 703 performs adaptation on levels +2 and −2, as described above. The filtered values are received by an adaptation decimation block 711, which decimates the adaptation rate by a predetermined value, as described above.

The decimated adaptation data is input to an adaptation pipeline block 704, which comprises a delay for each tap of structure 700. The delayed adaptation data from block 704 is multiplied, in an adjustment block 713, by the error signal shifted by a pre-determined parameter µ, and the resultant product is output to update coefficient values of structure 700, and also as an input to equalization block 712.

Figure 18A:
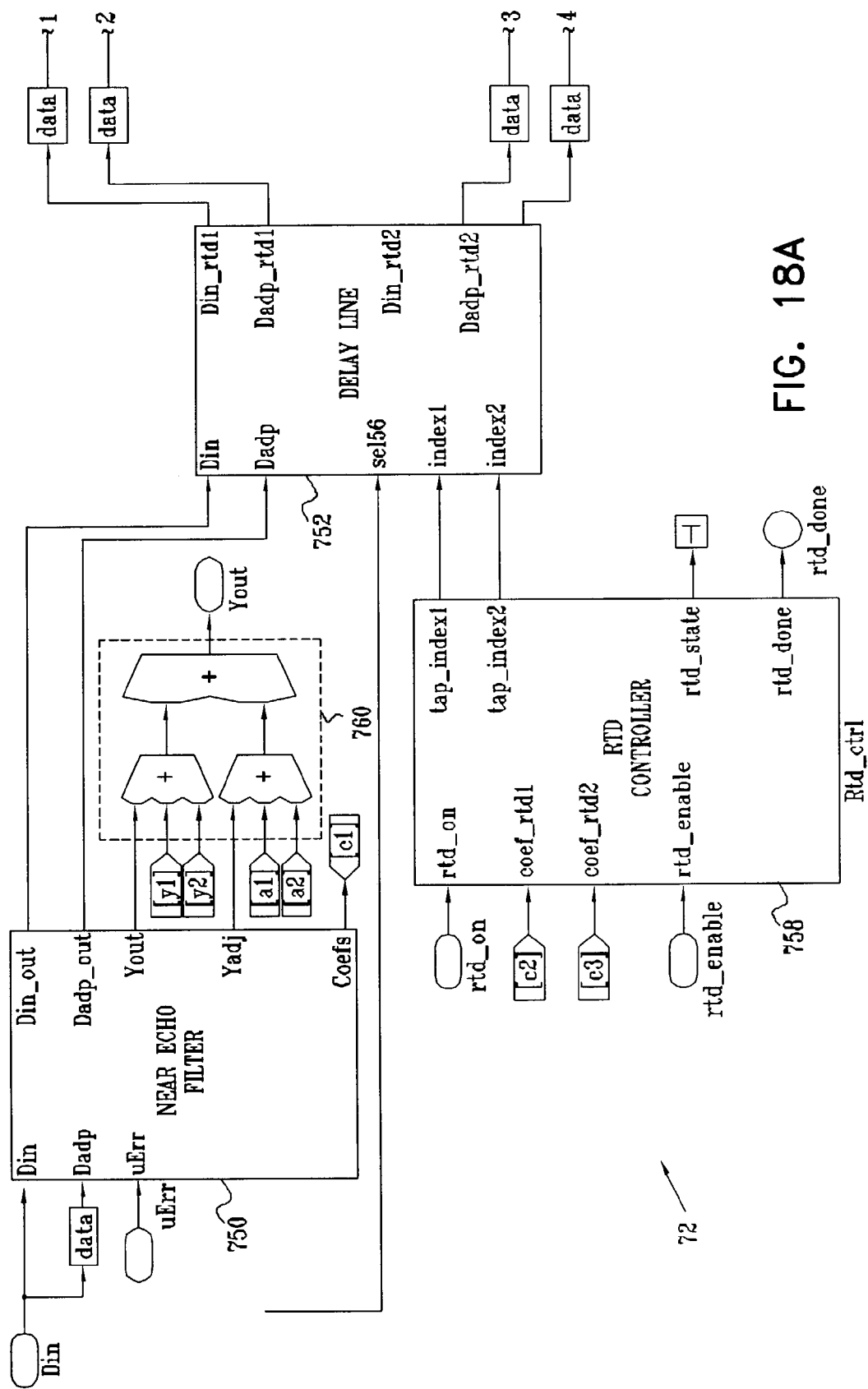
FIGS. 18A and 18B are schematic block diagrams of an echo canceller, according to a preferred embodiment of the present invention.
Figure 18B:
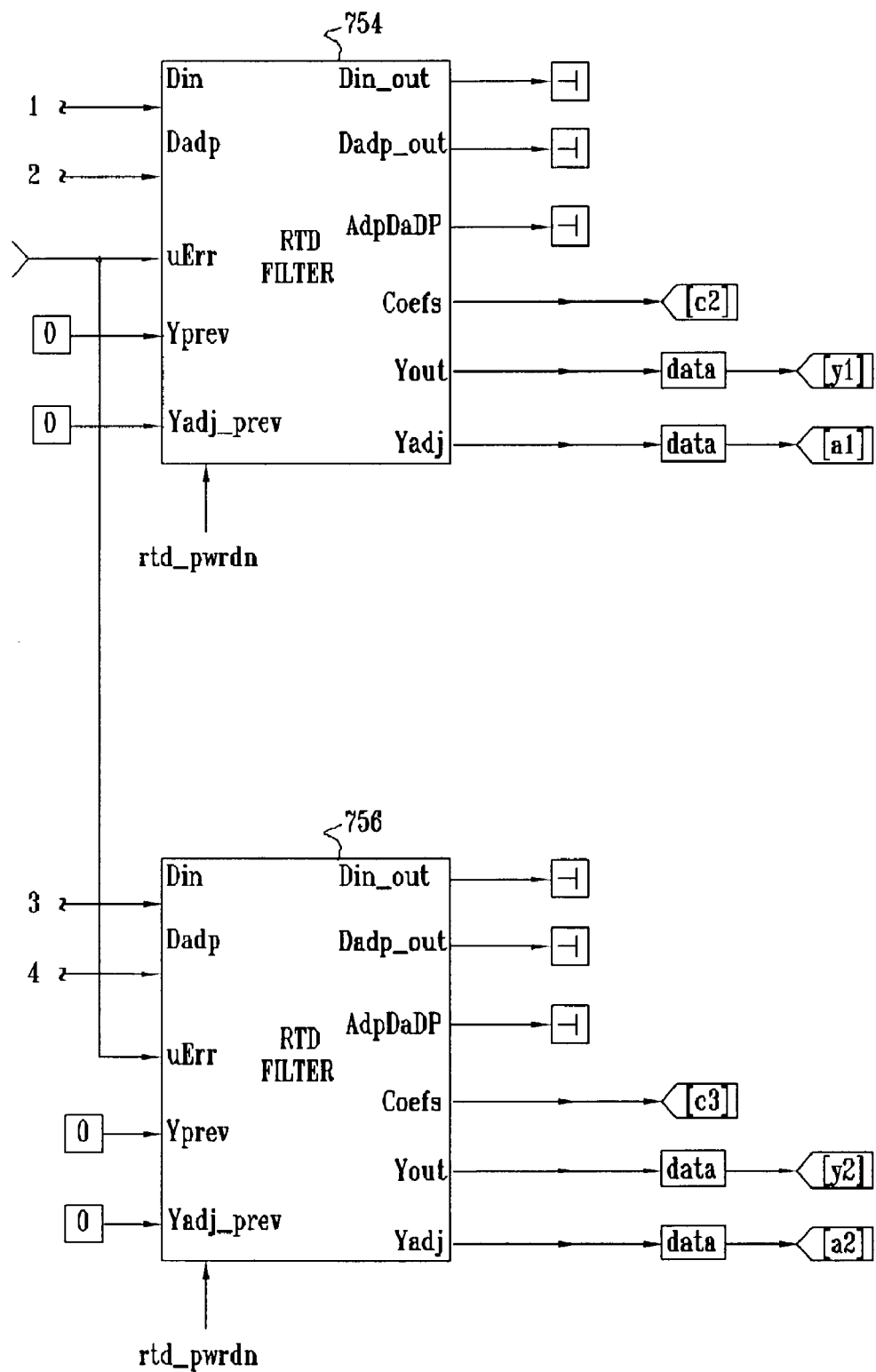

FIGS. 18A and 18B are schematic block diagrams of Echo canceller 72 (FIGS. 2 and 13), according to a preferred embodiment of the present invention. Canceller 72 comprises a near-echo filter 750, which preferably consists of up to 56 filter taps arranged in blocks substantially similar to structure 700. Filter 750 is described in more detail with respect to FIGS. 19A and 19B below. Canceller 72 acts to cancel echo remaining after hybrid 31 (FIG. 1) of the transmitter 40, corresponding to the receiver 28 comprising the canceller, has performed its preliminary echo cancellation. Filter 750 receives its input signal data from the transmitter 40, and the input data is preferably delayed by five clock cycles in order to allow synchronization of adaptation data with the error signal. The output Yout of canceller 72 is derived from near-echo filter 750 and elements of the canceller which evaluate a round trip delay (RTD) of signals sent by corresponding transmitter 40.

An RTD controller 758, a delay line 752, and two RTD filters 754 and 756 implement parameters of the delay line and the RTD filters to correct the round trip delay. Delay line 752 preferably comprises two equivalent delay lines, one for the equalization data in filters 754 and 756, and a second for the adaptation data in the filters. Each delay line may preferably introduce a delay of up to 124 cycles, and the delay is most preferably set in steps of 4 cycles. Each of the delay lines in delay line 752 is preferably implemented from separately powered registers and delays comprised in the respective delay lines.

RTD controller 758 adjusts respective delays introduced into the input data by delay line 752, by setting two indices tap_index1 and tap_index2. The respective delays are used to position each of RTD filters 754 and 756, each comprising 16 taps, in the overall filter so as to absorb maximum echo energy. A preferred method of positioning the RTD filters is described below with reference to FIG. 20. Outputs y1 and y2 of filters 754 and 756 are summed in summers 760; summers 760 also receive adjustments a1, a2 and Yadj of filters 754, 756 and 750, most preferably in ones complement form, to produce the final output Yout of canceller 72.

Figure 19A:
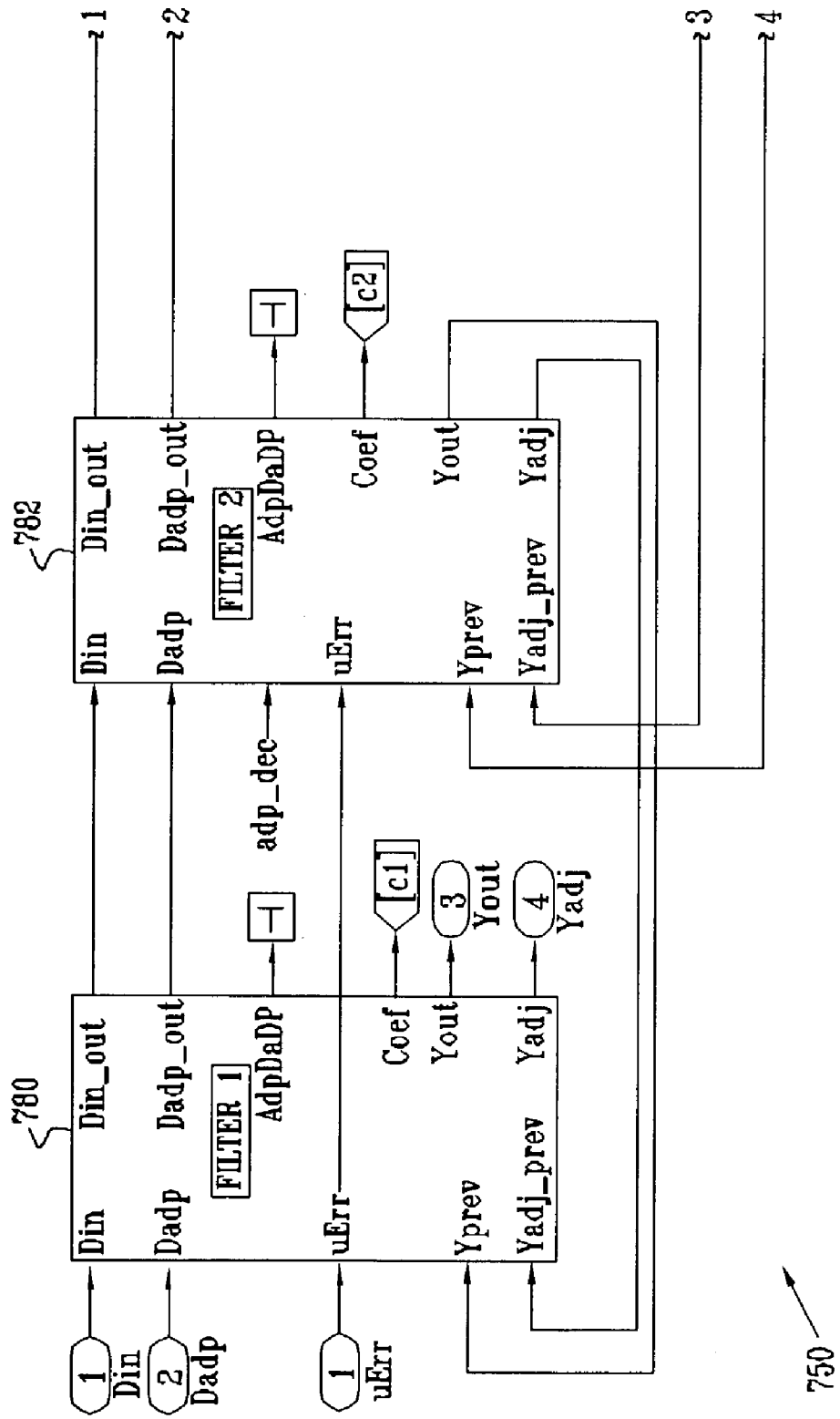
FIGS. 19A and 19B are schematic block diagrams of a near-echo filter comprised in the echo canceller of FIGS. 16A and 16B, according to a preferred embodiment of the present invention.
Figure 19B:
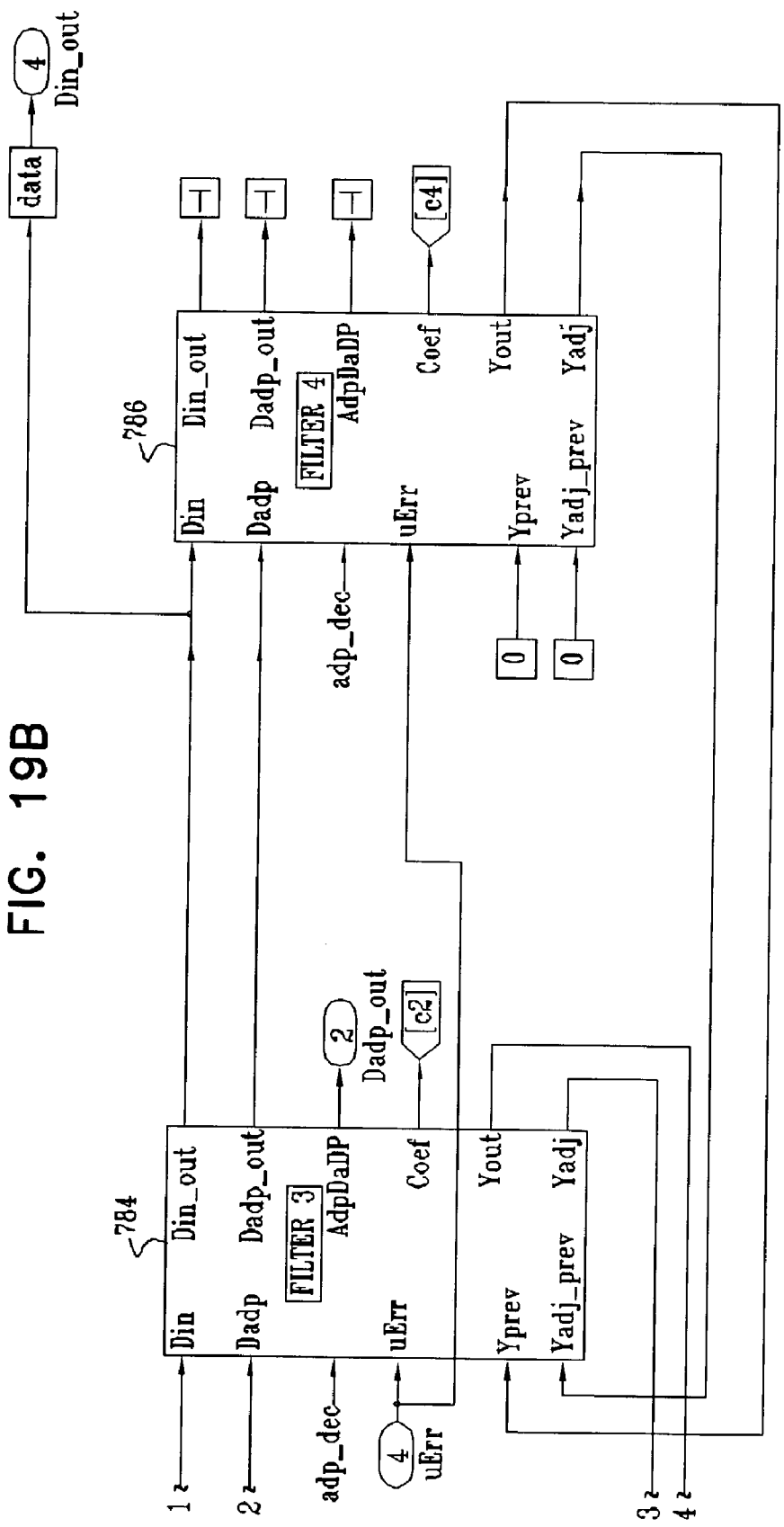

FIGS. 19A and 19B are schematic block diagrams of near-echo filter 750, according to a preferred embodiment of the present invention. Filter 750 comprises four filter blocks, each having a structure substantially similar to structure 700 (FIG. 17), which most preferably enable filter 750 to have up to 56 taps. Block 780 preferably comprises five filter taps in a transpose-form architecture, as described with reference to FIG. 12. Block 782 preferably comprises 28 filter taps in a hybrid-form architecture with a hybrid factor of 7, as described with reference to FIG. 15. Blocks 784 and 786 preferably comprise 7 and 16 filter taps respectively, both in a transpose-form architecture. Most preferably, at least one of the filter blocks, preferably block 786, may be powered-down so as to shorten the filter length from its maximum 56 taps. Powering-down block 786 reduces the total number of taps to 40.

Filter blocks 780, 782, and 784 have an effective hybrid factor of 7, since the output of block 784 is the summation of the its seven taps. and since the five taps of block 780 are combined with its previous result, with the outputs of RTD filters 754 and 756 in summers 760 (FIG. 18A), and in the registers comprised in summer 502 (FIG. 13). A hybrid factor of 7 uses an 8-input adder, corresponding with the optimal factor of $2^3-1$ described above. Filter blocks 780, 782, and 784 most preferably maintain a 22-bit coefficient with a dynamic range between +1 and −1 for internal operation, and the eleven most significant bits (MSBs) of the coefficient are used for equalization.

Filter block 786 and RTD filters 754 and 756 have a hybrid factor of 16, and so utilize a 16-input adder. These filters most preferably generate a 20-bit coefficient with a dynamic range between +¼ and −¼ for internal operation, and the nine MSBs of the coefficient are used for equalization. Reducing the number of MSBs allows optimal use of the 16-input adder.

As shown in FIGS. 19A and 19B, the input data (Din and Dadp) of filter 750 are cascaded from left to right through the filter blocks. The output data (Yout and Yadj) are cascaded in the reverse direction.

Blocks 780, 782, 784 and 786 may perform adaptation decimation, as described above with reference to structure 700, according to predetermined values set by decimation setting parameters adp_dec input to control logic 500. The decimation rate for blocks 780 and 782 can preferably be set at a value of 2, 4, or 8. The decimation rate for blocks 784 and 786, and for filters 754 and 756 (FIG. 18B) is preferably set to be a multiple, chosen from the values {1,2,4,8,16}, of the decimation rate set for blocks 780 and 782. Alternatively, the blocks may be implemented not to perform decimation. In addition, each block is implemented to have an adaptation rate monitor, as described above, which activates if the measured decimation rate falls below a predetermined value, preferably four times an effective decimation rate.

Dividing the canceller 72 into two tap regions—a "lower tap" region comprising blocks 780 and 782 with 33 taps, and a "higher tap" region comprising blocks 784, 786, 754, and 756 with 55 taps—allows for more flexibility in setting decimation values. The flexibility enables power to be saved, by having high decimation values, without performance degradation. Preferably, the lower taps are set to have low decimation values, and the higher taps are set to have high decimation values.

Figure 20:
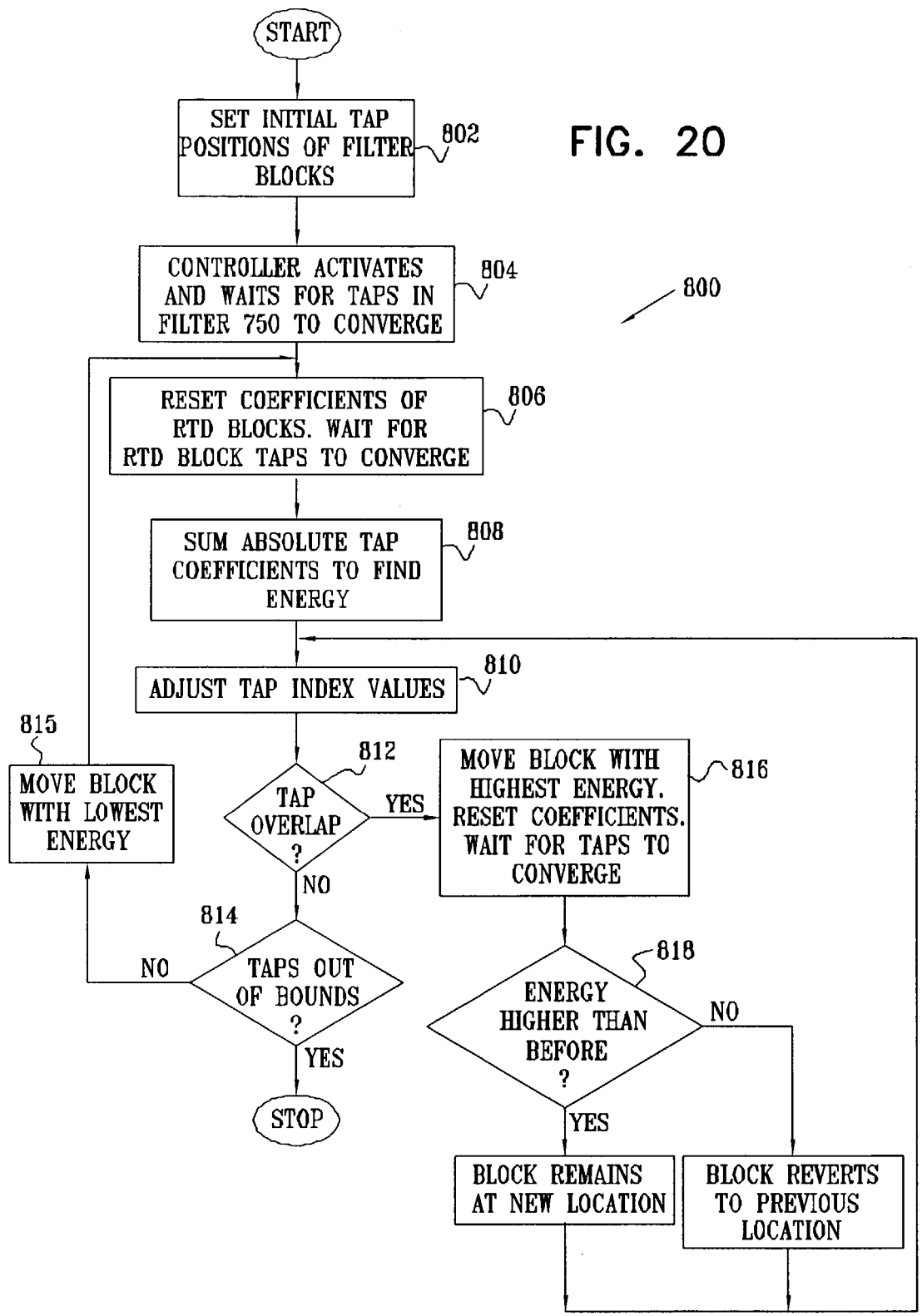
FIG. 20 is a flowchart illustrating a process followed by a round trip delay (RTD) controller, according to a preferred embodiment of the present invention.

FIG. 20 is a flowchart illustrating a process 800 followed by RTD controller 758 (FIG. 18A), according to a preferred embodiment of the present invention. Controller 758 most preferably operates as a state machine to implement process 800, which sets the delays before RTD blocks 754 and 756 operate. The delays are set as tap indices, which are provided to delay line 752. Process 800 measures the energy absorbed by blocks 754 and 756, and alters the position of the blocks so that they absorb the maximum amount of energy, corresponding to most echo noise. Alternatively, the state machine may be disabled, so that process 800 is not followed; in this case, the tap indices for blocks 754 and 756 are most preferably allocated by predetermined setting parameters tap_index_mid and tap_index-far input to control logic 500.

In an initial state 802, before controller 758 activates, block 754 is set to be directly after the last tap of filter 750, and block 756 is set to be directly after the last tap of block 754. Thus, if block 786 in filter 750 is activated, blocks 754 and 756 have effective tap positions 57–72 and 73–88; if block 786 is not activated, blocks 754 and 756 have effective tap positions 41–56 and 57–72.

In an activation step 804, controller 758 activates during the initialization phase of receiver 28 and waits a predetermined time for the taps of the active blocks in filter 750 to converge.

At a beginning of a recursion sequence step 806, controller 758 resets the coefficients of blocks 754 and 756, and allows the taps of these blocks to converge.

In an energy measurement step 808, the absolute values of the tap coefficients for each block 754 and 756 are summed. The two sums are used as a measure of the energy being input to the respective blocks.

In an index calculation step 810 controller 758 adjusts initial values of tap_index1 and tap_index2, the indices respectively governing the delays for RTD blocks 754 and 756. The indices are preferably adjusted in steps of 4 or 8 taps. After adjustment, the block with the lowest energy, as measured in step 808, moves to its new index, unless one of conditions 812 and 814 is true, as shown in a step 815.

In a check overlap condition 812, the positions of the taps of blocks 754 and 756 are checked. If there is no overlap between the blocks, process 800 continues to a check out-of-bounds condition 814. If there is overlap between the blocks, the process continues to an overlap-exists step 816.

In check out-of-bounds condition 814, controller 758 checks to see that the values of tap_index1 and tap_index2 are within a predetermined bound. If the values are within the bound, process 800 returns to step 806. If one of the indices exceed the bound, process 800 stops.

In overlap-exists step 816, rather than the block with the lowest energy moving, as in step 810, the block with the highest energy moves to the new index value. Controller resets the block taps and waits for the taps of the block in its new position to converge.

In a check-energy condition 818, controller 758 then checks if the energy of the block in the new index value is higher than the block's previous energy. If the energy is higher, then the block remains at the new index value. If the energy is not higher, then the block reverts to its previous index value. Process 800 then continues by returning to a position after step 808.

Once process 800 has completed, RTD blocks 754 and 756 are in positions having highest measured energies. It will be appreciated that the process enables blocks comprising 32 taps to be adaptively moved so that maximum echo energy is absorbed. It will be further appreciated that using blocks having adjustable positions saves considerable power compared to static systems, such as full echo cancellers known in the art, which require considerably more taps to absorb the maximum echo energy. Preferably, controller 758 is implemented to power down one of the RTD blocks if its measured energy is smaller by a predetermined factor than the other RTD block, further reducing power consumption of the filter. The predetermined factor is set by an rtd_pwrdn parameter input to control logic 500. Further preferably, controller 758 is preferably implemented to power down unused registers in delay line 752, further reducing power consumption of the filter.

Figure 21:
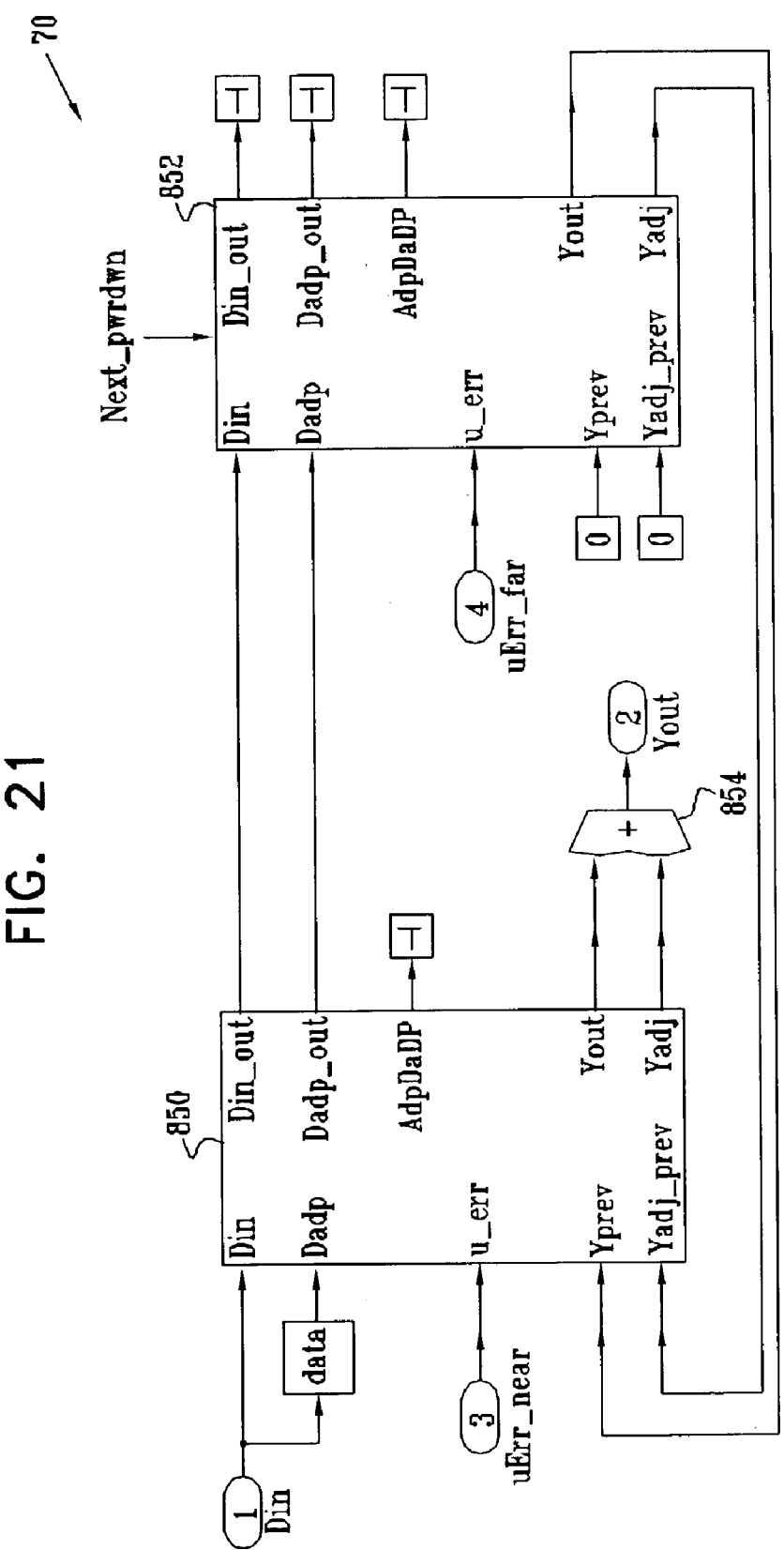
FIG. 21 is a schematic block diagram of the NEXT cancellers of FIG. 11, according to a preferred embodiment of the present invention.

FIG. 21 is a schematic block diagram of NEXT canceller 70, according to a preferred embodiment of the present invention. As shown in FIGS. 2 and 13, receiver 28 comprises three substantially similar NEXT cancellers, each canceller receiving data from a transmitter 40 transmitting on a neighboring channel to receiver, and using the data to cancel cross-talk generated by the transmitters. NEXT canceller 70 comprises a first filter block 850 and a second filter block 852, each block having a structure substantially similar to structure 700 (FIG. 17).

Filter block 850 preferably comprises 14 filter taps; filter block 852 preferably comprises 28 filter taps, and both filters are implemented with a hybrid factor of 7, and each adder in the output path is most preferably an 8-adder. In addition, the last 7 or the last 14 taps in filter block 852 may most preferably by powered down, according to a predetermined factor next-pwrdn input to control logic 500, so that the overall number of taps in canceller 70 may be set to be 28, 35, or 42.

Most preferably, filter block 850 maintains a 19-bit coefficient with a dynamic range between $$+\frac{1}{8}$$

and $$-\frac{1}{8}$$

for internal operation, and filter block maintains a 17-bit coefficient with the same resolution as those of block 852, but with a dynamic range between $$+\frac{1}{32}$$

and $$-\frac{1}{32}$$

for internal operation. Preferably, for equalization block 850 uses the eight MSBs of its coefficients, but block 852 uses the six MSBs of its coefficients. Both filters generate fixed point results, block 850 having a resultant dynamic range between +2 and −2, block 852 having a resultant dynamic range between $$+\frac{1}{2}$$

and $$-\frac{1}{2}.$$

Input data, Din, are cascaded from block 850 to block 852. The outputs Yout and Yadj, the latter most preferably comprising a ones complement adjustment as described above, are cascaded from block 852 to block 850. A summer 854 sums Yout and Yadj to produce the final Yout from canceller 70.

Most preferably, each NEXT canceller 70 is implemented to perform adaptation decimation according to one or more predetermined adaptation decimation parameters input to the canceller. The decimation is preferably implemented to be at a rate chosen from the values {4, 8, 16}; alternatively, no decimation may be implemented. In addition, canceller 70 is preferably implemented to have an adaptation rate monitor, as described above, which activates if the measured decimation rate falls below a predetermined value, preferably four times an effective decimation rate. Decimation and rate monitoring are preferably implemented by methods generally similar, mutatis mutandis, to those described above with reference to FIGS. 19A and 19B.

The final Yout outputs from each NEXT canceller 70, as shown in FIGS. 2 and 13, are combined together, and are further combined with the output of canceller 72 to produce the input to FFE/Blind equalizer 54.

It will be appreciated that the scope of the present invention is not limited to a specific number of transmission lines acting as channels of communication, and that the number of lines may be substantially any plurality of lines.

Figure 22:
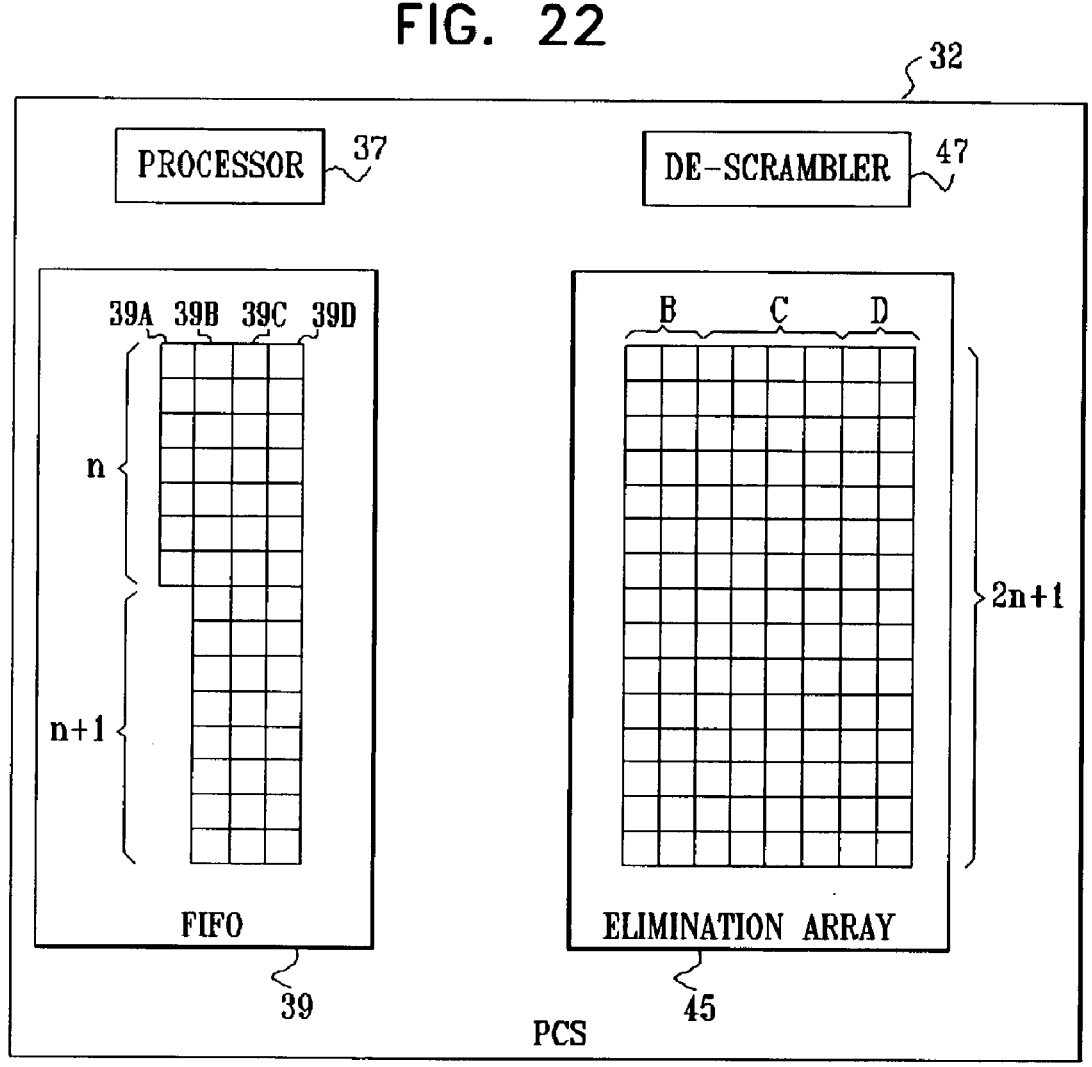
FIG. 22 is a schematic block diagram showing components used in a process for determining skew of signals entering the transceiver of FIG. 1, according to a preferred embodiment of the present invention.

FIG. 22 is a schematic block diagram showing components used in a process 900 for determining skew of signals entering transceiver 20, according to a preferred embodiment of the present invention. As shown in FIG. 1, transceiver 20 receives signals on four twisted pairs of conductors acting as channels, each signal, because of the nature of the channels, having relative skew therebetween. The signals are assumed to be transmitted as respective symbols, most preferably according to a start-up procedure of IEEE standard 802.3ab, and the four channels are herein termed channel A, channel B, channel C, and channel D. PCS 32 acts as an input circuit for receiving the channel signals, and comprises a processor 37, a first-in-first-out (FIFO) memory 39, a de-scrambler 47, and an elimination array memory 45, which implement the process for determining the relative skew between the channels. After PCS 32 has determined the skew of each of the four channels, it provides skew values to FIFO 50 (FIG. 2) which the FIFO uses to align the incoming signals.

Figure 23:
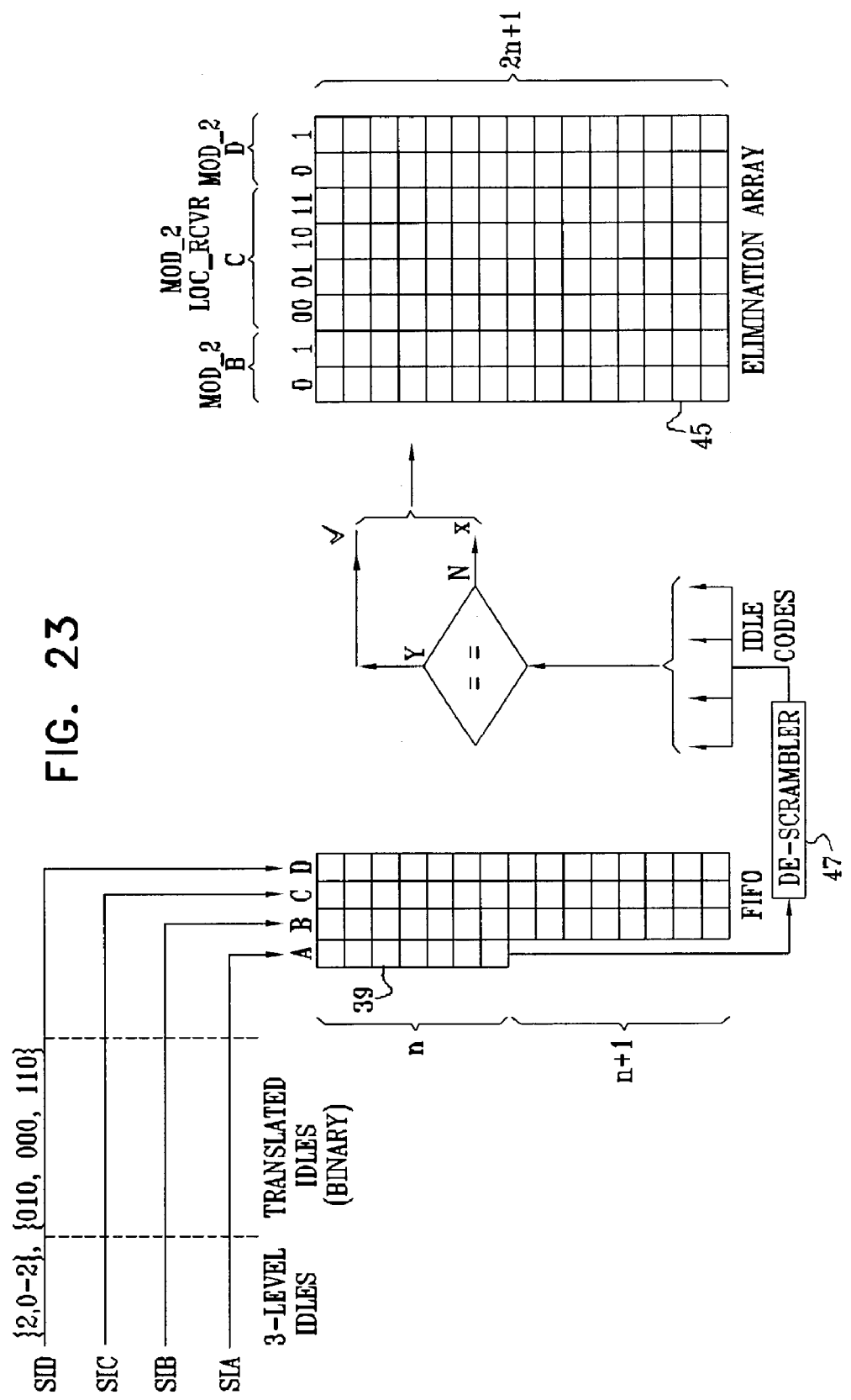
FIG. 23 is a logical flow diagram which schematically illustrates the process of FIG. 22, according to a preferred embodiment of the present invention.
Figure 24:
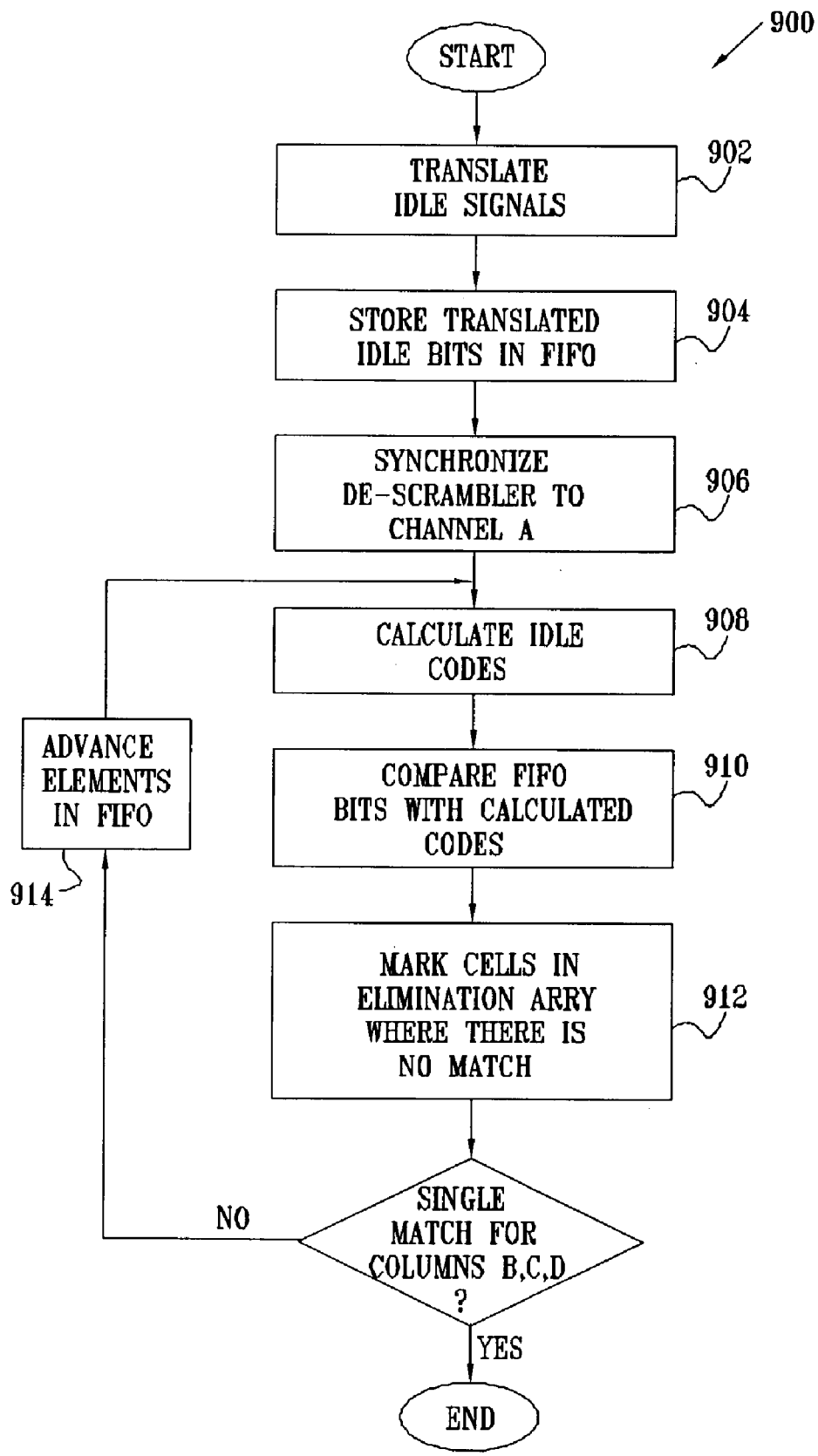
FIG. 24 is a flowchart showing steps in the process of FIG. 22, according to a preferred embodiment of the present invention.

FIG. 23 is a logical flow diagram which schematically illustrates process 900, and FIG. 24 is a flowchart showing steps in the process, according to a preferred embodiment of the present invention.

Process 900 is most preferably implemented by transceiver 20 during the initialization stage (described above with reference to FIG. 1) when remote transceiver 33 transmits scrambled idle symbols generated according to IEEE standard 802.3ab, the idle symbols representing a transmitted character. It will be understood, however, that process 900 may be applied to substantially any type of symbols transmitted over multiple channels, where skew between the channels occurs.

Transceiver 33 generates idle symbols and scrambles the idle symbols, according to a predetermined polynomial defined in standard 802.3ab, so as to generate scrambled idle symbols SIA, SIB, SIC, SID. The idle symbols generated are a function of a mode of communication between transceiver 33 and transceiver 20, which is determined by the values of transceiver 33 parameters loc_rcvr_status and mod_2. loc_rcvr_status defines a status of the overall link as being satisfactory or not. mod_2 defines a type of idle symbol to be transmitted. mod_2 and loc_rcvr_status may each take a value of 0 or 1.

SIB and SID are dependent on mod_2, and so for a specific data-symbol there are two possible symbols SIB and two possible symbols SID. SIC is dependent on loc_rcvr_status and mod_2, and so for a specific character there are four possible symbols SIC. SIA, SIB, SIC, SID are, by way of example, assumed to be transmitted at levels 2, 0, or −2, although it will be understood that they may be transmitted at substantially any plurality of levels.

In a translation step 902, processor 37 translates each level of SIA, SIB, SIC, SID to a string of three binary bits, most preferably according to Table II above.

In a storage step 904, processor 37 stores one of the binary bits of each string, most preferably the central bit, in respective cells of FIFO 39. FIFO 39 preferably comprises a reference column 39A (FIG. 22) of n cells that store n bits of channel A, and three columns 39B, 39C, 39D, of (2n+1) cells each that store (2n+1) bits of channels B, C, and D, as illustrated in FIG. 22, where n is a whole number. The value of n is preferably chosen so that the number of samples in column 39A is greater than the allowed skew. Thus, if SIA, SIB, SIC, SID are transmitted with a period of 8 ns, and a maximum allowed skew is 50 ns, n is preferably set to be 7 or more. Hereinbelow, n is assumed to be 7.

In a synchronization step 906, processor 37 and de-scrambling code stored in storage memory 43 preferably operate as data de-scrambler 47. Alternatively, de-scrambler 47 is implemented by a substantially hardware system. Processor 37 synchronizes the de-scrambler to the scrambler of remote transceiver 33, using the data stored in column 39A, by methods which will be apparent to those skilled in the art.

In a generate idle codes step 908, processor 37 inputs the first bit in FIFO column 39A to de-scrambler 47, which calculates the four possible idle codes (corresponding to the possible values of loc_rcvr_status and mod_2) and the corresponding possible values for channel B (2 values), channel C (4 values), and channel D (2 values). De-scrambler 47 and processor 37 thus act as a symbol predictor, generating the four possible idle codes as expected values of channels B, C, and D.

In a comparison step 910, processor 37 compares the calculated expected idle codes with corresponding columns 39B, 39C, 39D in FIFO 39. The results of the comparison are stored in elimination memory array 45. Array 45 has a depth of (2n+1), corresponding to the depth of FIFO 39, and comprises 8 columns $45B_0$, $45B_1$, $45C_{00}$, $45C_{01}$, $45C_{10}$, $45C_{11}$, $45D_0$, $45D_1$, each column corresponding to a possible type of channel symbol, as described above. Thus, for the two possible idle codes generated for channel B, processor 37 compares each of the 2n+1 bits stored in column 39B with the calculated idle bits. The processor performs a similar process for each of the 2n+1 bits stored in column 39C (comparison with four idle codes) and for each of the 2n+1 bits stored in column 39D (comparison with two idle codes).

In an elimination step 912, processor 37 marks each of the cells in array 45 where the comparison indicates no match.

Processor 37 then advances the bits in FIFO 39 by one cell, in a continuation step 914, and repeats steps 908, 910, and 912. In step 910, however, the processor only compares bits in FIFO 39 which still show as being matched (after step 912).

Steps 908, 910, 912, and 914 are repeated until only a single match is present in one of columns $45B_0$, $45B_1$, one of columns $45C_{00}$, $45C_{01}$, $45C_{10}$, $45C_{11}$, and one of columns $45D_0$, $45D_1$, after which process 900 stops. It will be appreciated that at this point, the vertical displacement of each of the single matches corresponds to the skew of each of channels B, C, and D relative to channel A. In addition, the columns of array 45 having the single matches indicate the values of mod_2 and loc_rcvr_status, so indicating the mode of communication between transceiver 20 and transceiver 33.

It will be appreciated that the above description applies to three non-reference channels, each of the channels possibly being in more than one state depending on a communication mode of transceiver 33 and transceiver 20, and that the number of columns of memory array 45 corresponds to the total number of combined channels and states. It will thus be appreciated that increasing the number of columns of array 45 allows process 900 to identify skew values and channel states in correspondingly greater numbers of states of the channels.

Figure 25:
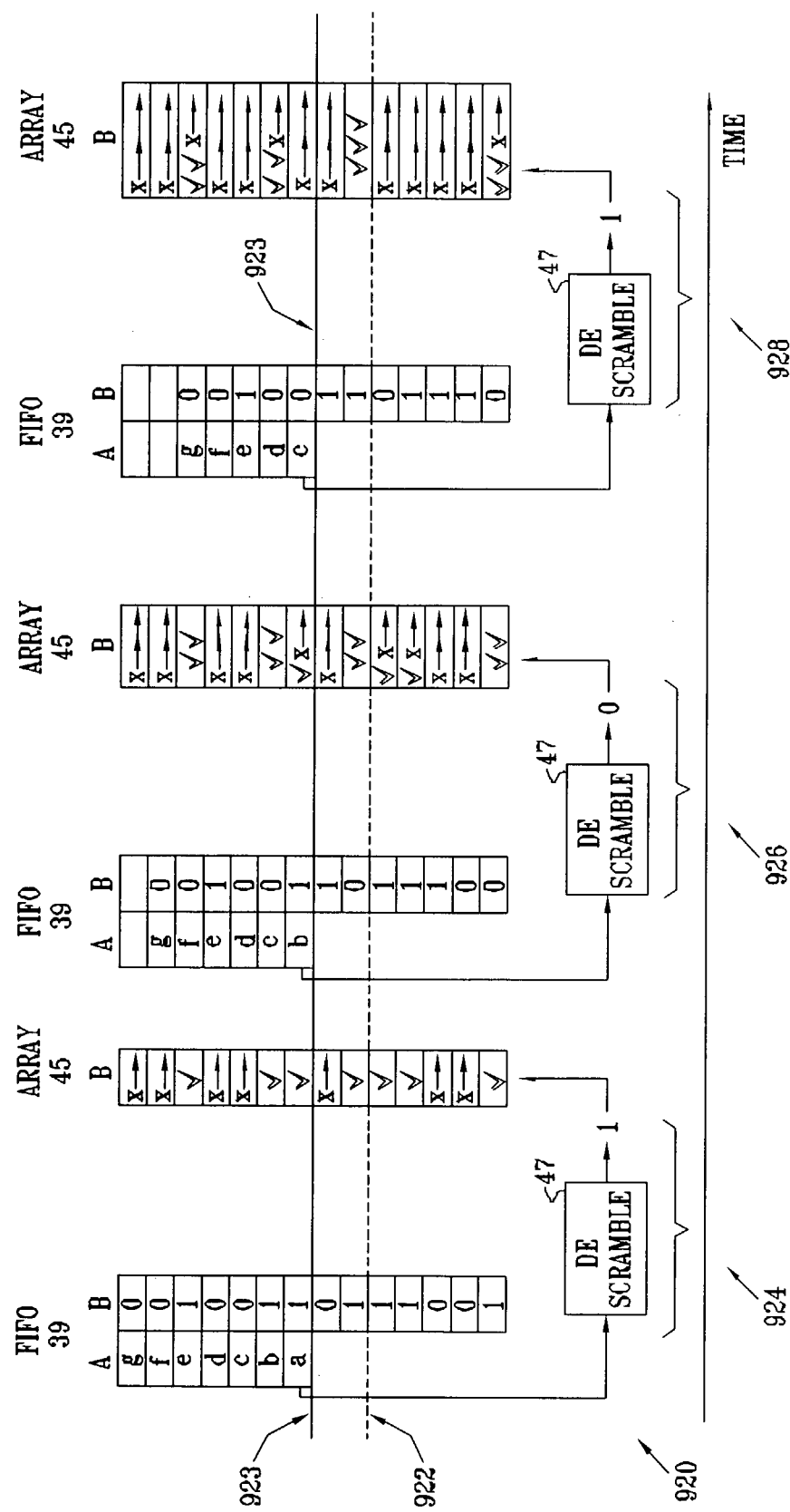
FIG. 25 is a state diagram illustrating an example of states of a first-in first-out memory and an elimination memory array used in the process of FIG. 22, according to a preferred embodiment of the present invention.

FIG. 25 is a state diagram 920 illustrating an example of states of FIFO 39 and elimination array 45 as process 900 operates, according to a preferred embodiment of the present invention. For clarity, only columns 39A and 39B of FIFO 39 are illustrated, de-scrambler 47 is assumed to generate only one idle code, and only one column 45B of memory array 45 is shown. For the purposes of the example, the skew of channel B is assumed to be 2 symbols ahead of channel A, indicated by a broken line 922 being two cells ahead of a reference line 923; column 39A is assumed to comprise 7 cells, and column 39B is assumed to comprise 15 cells At an initial time 924, columns 39A and 39B of FIFO 39 have been filled by incoming bits, as described above for steps 902 and 904. Bits in respective cells of column 39A are differentiated by letters a, b, c, d, e, f, and g. De-scrambler 47 then synchronizes to channel A, and identifies bit a as the bit to be operated on, de-scrambling bit a to generate 1—corresponding to the "1" directly above broken line 922. These operations correspond to steps 906 and 908.

In operations corresponding to steps 910 and 912 processor 37 compares the 1 generated by the de-scrambler with bits in FIFO column 39B to determine bits which match the 1, and stores the matches and "no matches" in array column 45B. Matched bits are shown as √, non-matched bits as x. After time 924 there are seven matched symbols in column 45B.

At a time 926, bits in FIFO 39 are advanced by one cell and the process described above for time 924 repeats. In this case, the de-scrambler identifies b as the bit to be de-scrambled, and generates from bit b the value 0—corresponding to the 0 directly above broken line 922. The 0 is compared with bits in column 39B where array column 45B indicates there is still a match. As shown in FIG. 25, after time 926 there are still four matched symbols in column 45B.

At a time 928, symbols in FIFO 39 are again advanced by one cell and the process repeats. The de-scrambler generates from symbol c the value 1, and this is compared with the four bits in column 39B where array column 45B indicates there is still a match. After this comparison there is one remaining match in array column 45B, and the process ends.

As is illustrated in FIG. 25, the displacement of the remaining match in memory array column 45B from reference line 923 is equal to the skew of channel B.

It will be appreciated that on a statistical basis, each comparison of processor 37 eliminates approximately half of the remaining matched symbols, until the single matched symbol corresponding to the skew remains. Furthermore, processor 37 is able to perform the comparisons for the different channels, and for the different possible idle codes for each channel, substantially in parallel. Thus, relatively few cycles of processor 37 are required to completely determine the skew of all incoming channels as well as the states of the different channels.

It will be understood that the principles described above may be applied to determining the skew between any multiplicity of channels upon which a signal is transmitted, by storing the skewed signals in a memory and sequentially comparing values using an elimination array until only one matched value remains in the array. It will be appreciated that the signals may be scrambled or non-scrambled. Furthermore, it will be appreciated that FIFO 39 and array 45 only need to have binary cells, regardless of the number of levels comprised in the incoming symbols. Alternatively, FIFO 39 may comprise cells which are capable of storing symbols having more than two levels.

The system described above with reference to FIGS. 22–25 determines skew between transmission lines and communication modes of signals transmitted on the lines. It will be appreciated that the system may be adapted to determine skew alone, for example if the communication mode is known, or the communication mode alone, for example if the skew is known. All such adaptations are assumed to be comprised within the scope of the present invention.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An equalizer, comprising:
a plurality of taps, each tap comprising a multiplier which is coupled to multiply a respective input sample by a respective coefficient, the taps being arranged in sequence so that the input sample to each of the taps, except to a first tap in the sequence, is delayed relative to a preceding tap in the sequence; and
an input selector, which is coupled to toggle the input sample to at least a selected tap among the plurality of taps, responsive to a state of the equalizer, so that the equalizer operates in a first state as a feed forward equalizer, and in a second state as a blind equalizer;
and comprising coefficient update circuitry, which receives an error signal as an input and determines the respective coefficient to be applied to each of the taps responsive to the error signal, wherein the error signal is provided in the second state by the selected tap, and wherein the input selector is adapted to toggle the input sample to the selected tap so that in the second state the input sample to the selected tap comprises a differential signal.

2. An equalizer according to claim 1, wherein the differential signal comprises a difference between the input sample to the selected tap and the input sample to the tap preceding the selected tap.

3. An equalizer according to claim 1, wherein at least one of the respective coefficients is zero.

4. An equalizer according to claim 1, and comprising a slicer which in the first state of the equalizer provides the error signal.

5. An equalizer according to claim 1, wherein the respective coefficient comprises a blind coefficient determined by the coefficient update circuitry when the equalizer is operative in the second state and a feed forward coefficient determined by the coefficient update circuitry when the equalizer is operative in the first state, and wherein the coefficient update circuitry determines the feed forward coefficient responsive to the blind coefficient.

6. An equalizer according to claim 5, wherein the feed forward coefficient for the selected tap comprises the blind coefficient for the selected tap, and wherein the feed forward coefficient for the tap preceding the selected tap comprises a difference between the blind coefficient for the selected tap and the blind coefficient for the tap preceding the selected tap.

7. A method for equalization, comprising:
providing a plurality of taps in an equalizer, each tap comprising a multiplier which is coupled to multiply a respective input sample by a respective coefficient;
arranging the taps in sequence so that the input sample to each of the taps, except to a first tap in the sequence, is delayed relative to a preceding tap in the sequence; and
toggling the input sample to at least a selected tap among the plurality of taps, responsive to a state of the equalizer, so that the equalizer operates in a first state as a feed forward equalizer, and in a second state as a blind equalizer;
and comprising:
receiving an error signal as an input;
determining the respective coefficient to be applied to each of the taps responsive to the error signal, wherein the error signal is provided in the second state by the selected tap; and
toggling the input sample to the selected tap so that in the second state the input sample to the selected tap comprises a differential signal.

8. A method according to claim 7, wherein the differential signal comprises a difference between the input sample to the selected tap and the input sample to the tap preceding the selected tap.

9. A method according to claim 7, wherein at least one of the respective coefficients is zero.

10. A method according to claim 7, and comprising, in the first state of the equalizer, providing the error signal from a slicer.

11. A method according to claim 7, and comprising:
operating the equalizer in the second state so as to determine the respective coefficient as a blind coefficient; and
determining a feed forward coefficient of the equalizer responsive to the blind coefficient, when the equalizer is operative in the first state.

12. A method according to claim 11, wherein the feed forward coefficient for the selected tap comprises the blind coefficient for the selected tap, and wherein the feed forward coefficient for the tap preceding the selected tap comprises a difference between the blind coefficient for the selected tap and the blind coefficient for the tap preceding the selected tap.

* * * * *